(12) United States Patent
Dudar

(10) Patent No.: US 10,746,093 B2
(45) Date of Patent: Aug. 18, 2020

(54) SYSTEMS AND METHODS FOR TURBO WASTEGATE DIAGNOSTICS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 342 days.

(21) Appl. No.: 15/831,634

(22) Filed: Dec. 5, 2017

(65) Prior Publication Data

US 2019/0170061 A1 Jun. 6, 2019

(51) Int. Cl.
*F02B 37/18* (2006.01)
*F02D 41/00* (2006.01)
*F02B 37/22* (2006.01)
*F02B 39/10* (2006.01)
*F02D 41/22* (2006.01)
*F02B 37/04* (2006.01)
*F02D 9/02* (2006.01)
*F02D 41/04* (2006.01)

(52) U.S. Cl.
CPC ............ *F02B 37/186* (2013.01); *F02B 37/04* (2013.01); *F02B 37/18* (2013.01); *F02B 37/225* (2013.01); *F02B 39/10* (2013.01); *F02D 41/0007* (2013.01); *F02D 41/221* (2013.01); *F02D 41/0055* (2013.01); *F02D 41/042* (2013.01); *F02D 2009/0225* (2013.01)

(58) Field of Classification Search
CPC ........ F02B 37/186; F02B 39/10; F02B 37/18; F02B 37/04; F02B 37/225; F02D 41/22; F02D 41/221; F02D 41/222; F02D 41/0007; F02D 41/042; F02D 41/0055; F02D 2009/0225
USPC .............................................. 60/602; 73/1.16
See application file for complete search history.

(56) References Cited

U.S. PATENT DOCUMENTS 6,499,299 B2 12/2002 Propernick
9,097,245 B2 8/2015 Knoblauch-Xander et al.
9,448,133 B2 9/2016 Malone
2016/0178470 A1 6/2016 Ge

*Primary Examiner* — Laert Dounis
*Assistant Examiner* — Edward Bushard
(74) *Attorney, Agent, or Firm* — Geoffrey Brumbaugh; McCoy Russell LLP

(57) ABSTRACT

Methods and systems are provided for indicating whether a wastegate positioned in a vehicle exhaust system is stuck in a closed or open configuration. In one example, a method comprises activating an electric air compressor positioned in an intake of the engine and obtaining a first baseline air flow and a second baseline air flow in the exhaust system, and in response to an indication that the wastegate is potentially stuck open or closed, obtaining a test air flow measurement via activating the electric air compressor and comparing the test air flow in the exhaust system to the first and/or the second baseline air flow. In this way, the wastegate may be diagnosed under conditions of limited engine operation, such as that which may occur in hybrid electric vehicles.

13 Claims, 10 Drawing Sheets

SYSTEMS AND METHODS FOR TURBO WASTEGATE DIAGNOSTICS

FIELD

The present description relates generally to methods and systems for controlling a vehicle engine to utilize an electronic booster as a means for diagnosing whether a turbo wastegate is functioning as desired.

BACKGROUND/SUMMARY

Vehicle systems that include turbochargers typically utilize a wastegate, or wastegate valve, that functions to regulate boost pressure by routing excess exhaust gas around a turbine positioned in an exhaust system. More specifically, when boost pressure approaches a predetermined threshold pressure, or under conditions where there is a risk of turbine overspeed, the wastegate valve may be opened to channel exhaust directly toward a tailpipe, without imparting energy to the turbocharger. However, due to varying temperatures, and the constituents of the exhaust gas, such valves may accumulate a build-up of hydrocarbons, soot, and other compounds. Such build-up can in some examples result in the wastegate being stuck in a closed configuration, or an open configuration. A stuck closed wastegate may result in innacurate boosting engine overheating, turbine overspeed, etc. A stuck open wastegate may result in low boost, poor fuel economy and/or undesired emissions. Accordingly, under conditions where such symptoms are observed and/or indicated via vehicle diagnostics, diagnosing whether the indicated symptoms are the result of a stuck open or stuck closed wastegate may allow for mitigating actions to be undertaken quickly, which may prevent undesired degradation of the engine system.

One example approach for diagnosing whether a wastegate is functioning as desired is shown by Xinyu, G. E. in US 20160178470. Therein, a method includes defining a measurement window for performing sensor diagnostics, the measurement window occurring when a plurality of engine conditions fall within particular value ranges, identifying the measurement window during operation of the engine, collecting wastegate position data and sensor data within the measurement window, and via the use of a regression model, inferring a wastegate that is potentially not functioning as desired in response to an indication that a threshold number (e.g. 4) of sensors are indicated to be not functioning as desired. In other words, if the threshold number of sensors are not indicated to be functioning as desired, the likely culprit is not the sensors as it is unlikely that all should fail, but rather, that the wastegate is not functioning as desired.

However, the inventors have herein recognized potential issues with such an approach. Particularly with regard to hybrid electric vehicles, engine operation may be limited, and accordingly, there may rarely be opportunities where conditions satisfying the measurement window are indicated to be met, thus limiting opportunities to diagnose the wastegate. Under conditions where the wastegate is not functioning as desired, but where conditions are not met for conducting the diagnostic for a period of time, any engine operation may result in degradation of engine components. Furthermore, reliance on a regression model may be prone to error, as the engine and its components age and become susceptible to degradation. Accordingly, another method that may be particularly useful for hybrid vehicles, is desired.

In one example, the issues described above may be addressed by a method comprising activating an electric air compressor in an intake of an engine and monitoring air flow in an exhaust system of the engine to obtain a first and a second baseline air flow, and during a degradation test, the degradation test requested responsive to an indication of engine degradation, diagnosing whether a wastegate in the exhaust system is functioning as desired by activating the electric air compressor and comparing a test air flow in the exhaust system to the first and/or the second baseline air flow. In this way, the wastegate may be diagnosed under conditions where engine operation is limited, such as is the case for hybrid electric vehicles.

As an example of the method, just prior to activating the air compressor to obtain the first baseline air flow, the second baseline air flow, and just prior to diagnosing whether the wastegate is functioning as desired, the method may include controlling the engine via a motor to a predetermined position, where the predetermined position includes a predetermined piston coupled to a predetermined cylinder of the engine within a threshold number of degrees from top dead center.

As another example of the method, obtaining the first and the second baseline air flow, and diagnosing whether the wastegate is functioning as desired may include monitoring air flow in the exhaust system of the engine with an exhaust gas recirculation valve positioned in an exhaust gas recirculation passage for a predetermined duration with the exhaust gas recirculation valve closed, then monitoring air flow in the exhaust system of the engine with the exhaust gas recirculation valve open, and obtaining a difference between air flow with the exhaust gas recirculation valve open compared to air flow with the exhaust gas recirculation valve closed to provide the first baseline flow, the second baseline air flow, or the test flow. In some examples, the first baseline air flow, the second baseline air flow, and the test air flow is monitored via a differential pressure sensor positioned in an exhaust system downstream of a turbine. As one example, the differential pressure sensor may be coupled to a gasoline particulate filter.

As another example of the method, the first baseline air flow may be obtained with the wastegate commanded to a fully closed configuration, and the second baseline air flow may be obtained with the wastegate commanded to a fully open configuration. In such an example, the test air flow may be obtained via commanding the wastegate to the fully open configuration under conditions where the indication of engine degradation includes an indication that the wastegate is stuck closed, and wherein the test air flow may be obtained via commanding the wastegate to the fully closed configuration under conditions where the indication of engine degradation includes an indication that the wastegate is stuck open. Accordingly, diagnosing whether the wastegate is functioning as desired may thus include indicating the wastegate is stuck closed responsive to the test air flow under conditions where the wastegate is commanded to the fully open configuration being within a threshold of the first baseline air flow, and indicating the wastegate is stuck open responsive to the test air flow under conditions where the wastegate is commanded to the fully closed configuration being within a threshold of the second baseline air flow.

By diagnosing the wastegate in vehicles where engine run-time may be limited, potential issues related to engine degradation may be indicated and mitigating actions may be taken, such that such engine degradation may be reduced or avoided.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
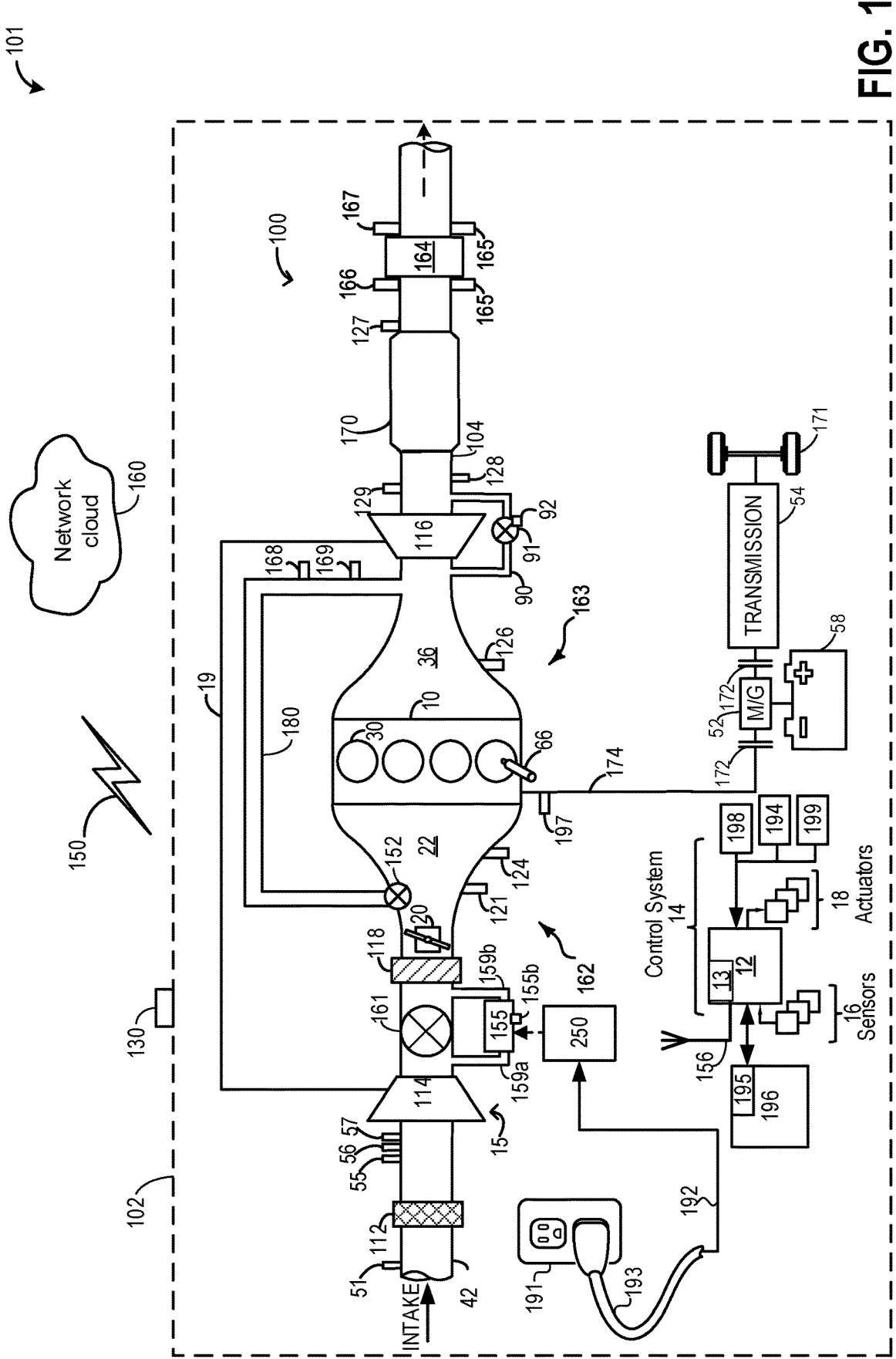
FIG. 1 schematically shows a vehicle system including an engine system with a wastegate.
Figure 3:
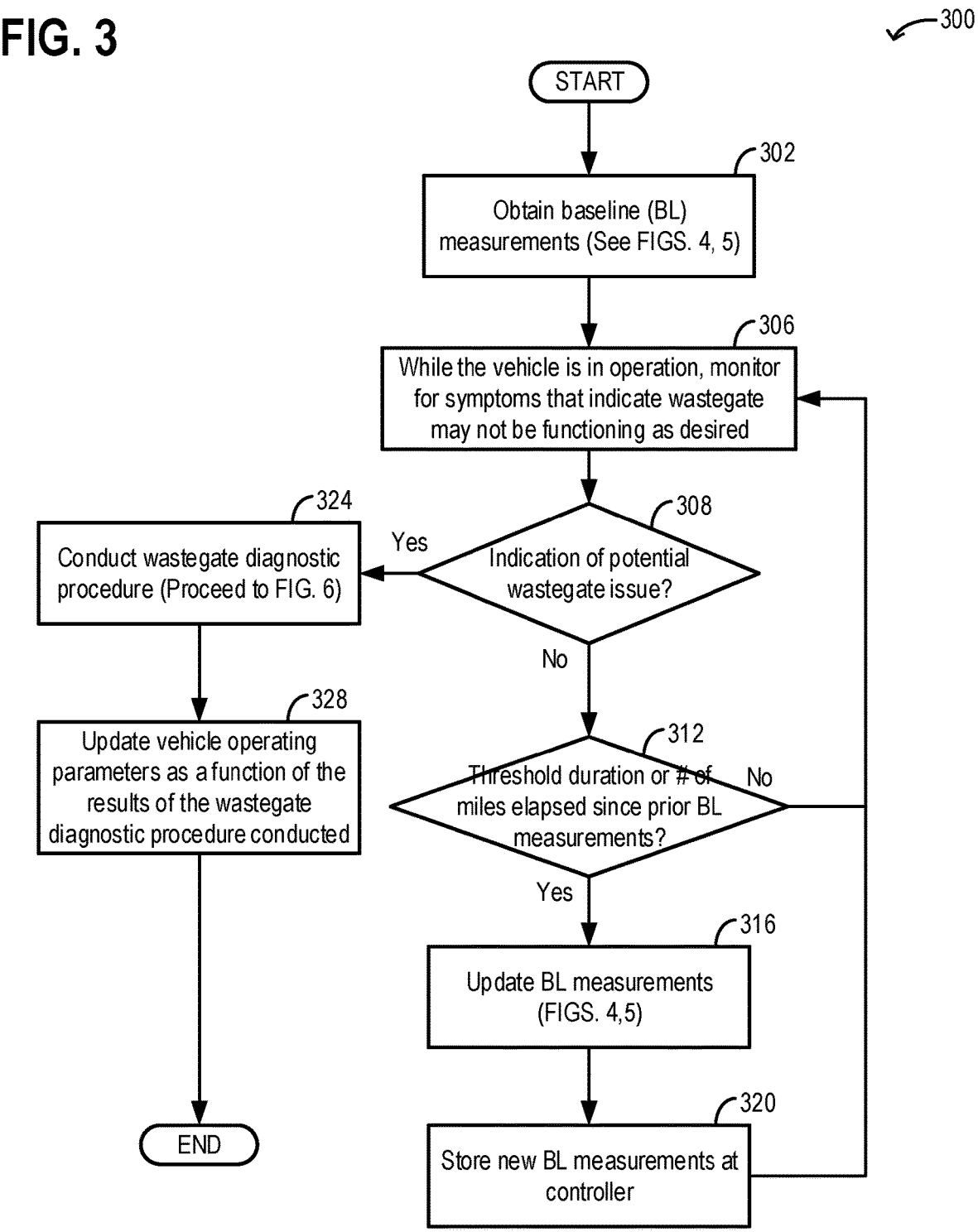
FIG. 3 shows an example method for determining whether to conduct baseline measurements and/or conduct a wastegate diagnostic procedure.
Figure 4:
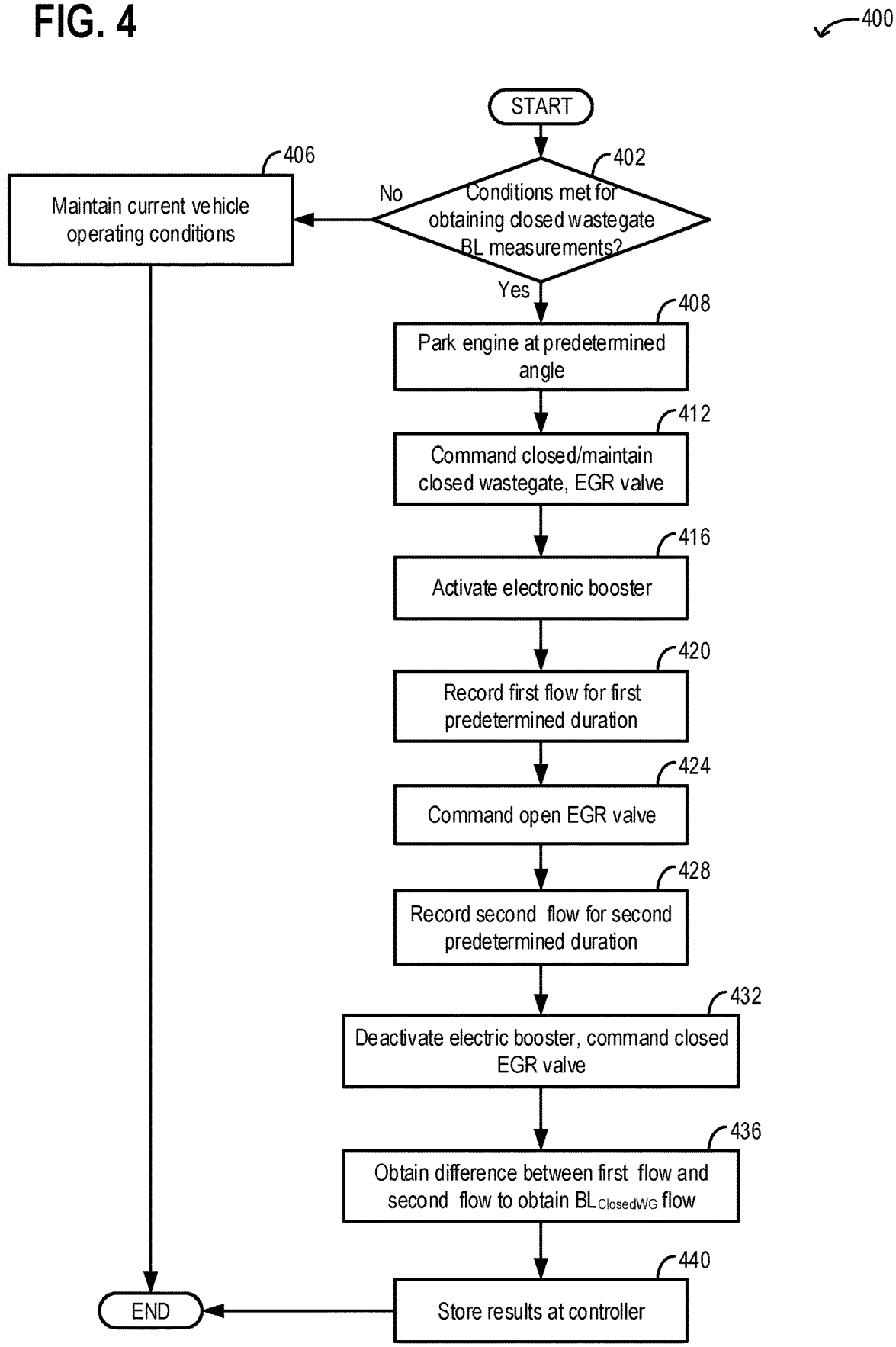
FIG. 4 shows an example method for obtaining baseline air flow measurements through the engine system, under conditions where the wastegate is closed.
Figure 5:
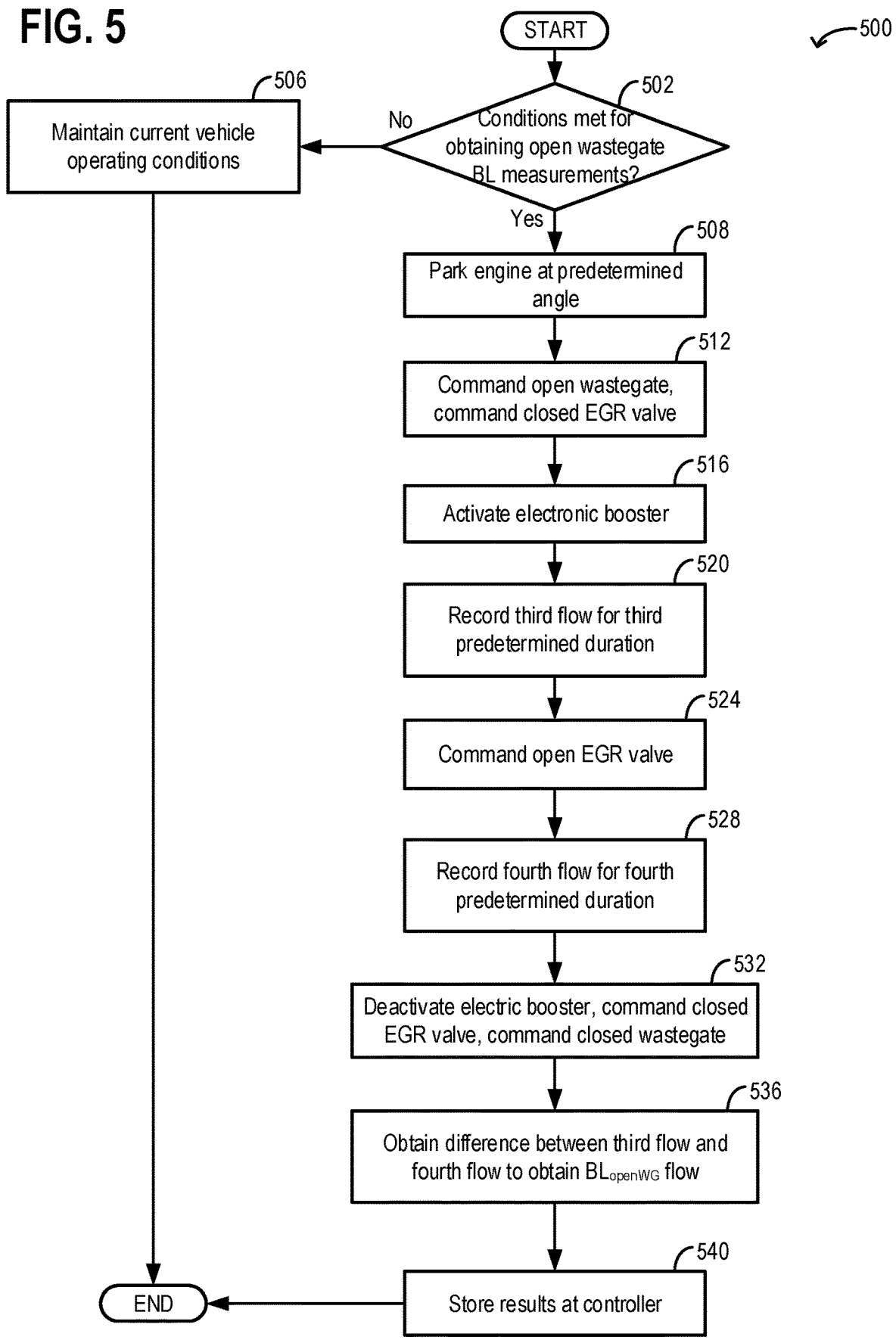
FIG. 5 shows an example method for obtaining baseline air flow measurements through the engine system, under conditions where the wastegate is open.
Figure 6:
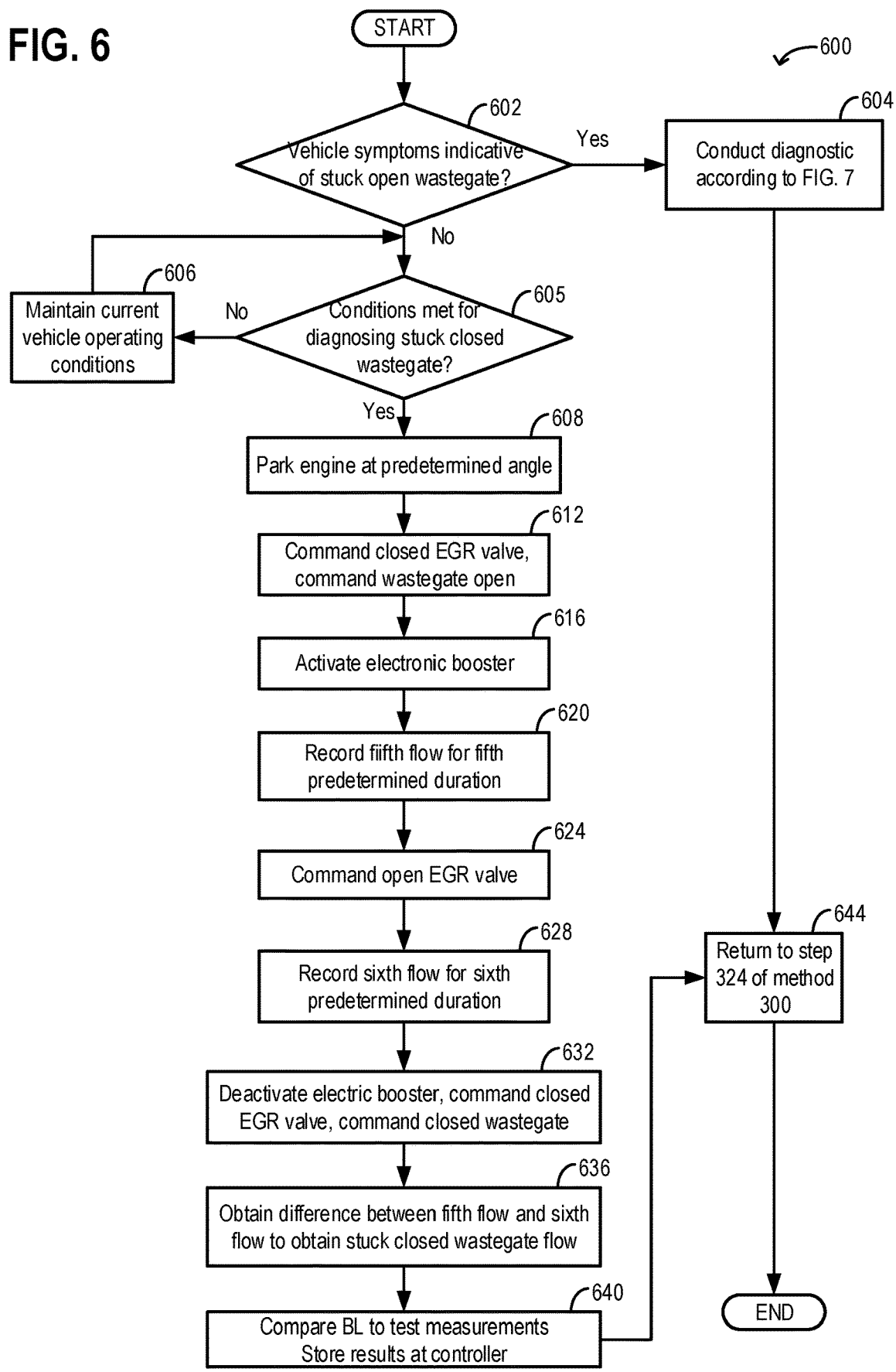
FIG. 6 shows an example method for conducting a wastegate diagnostic under conditions where the wastegate is indicated to be potentially stuck closed.
Figure 7:
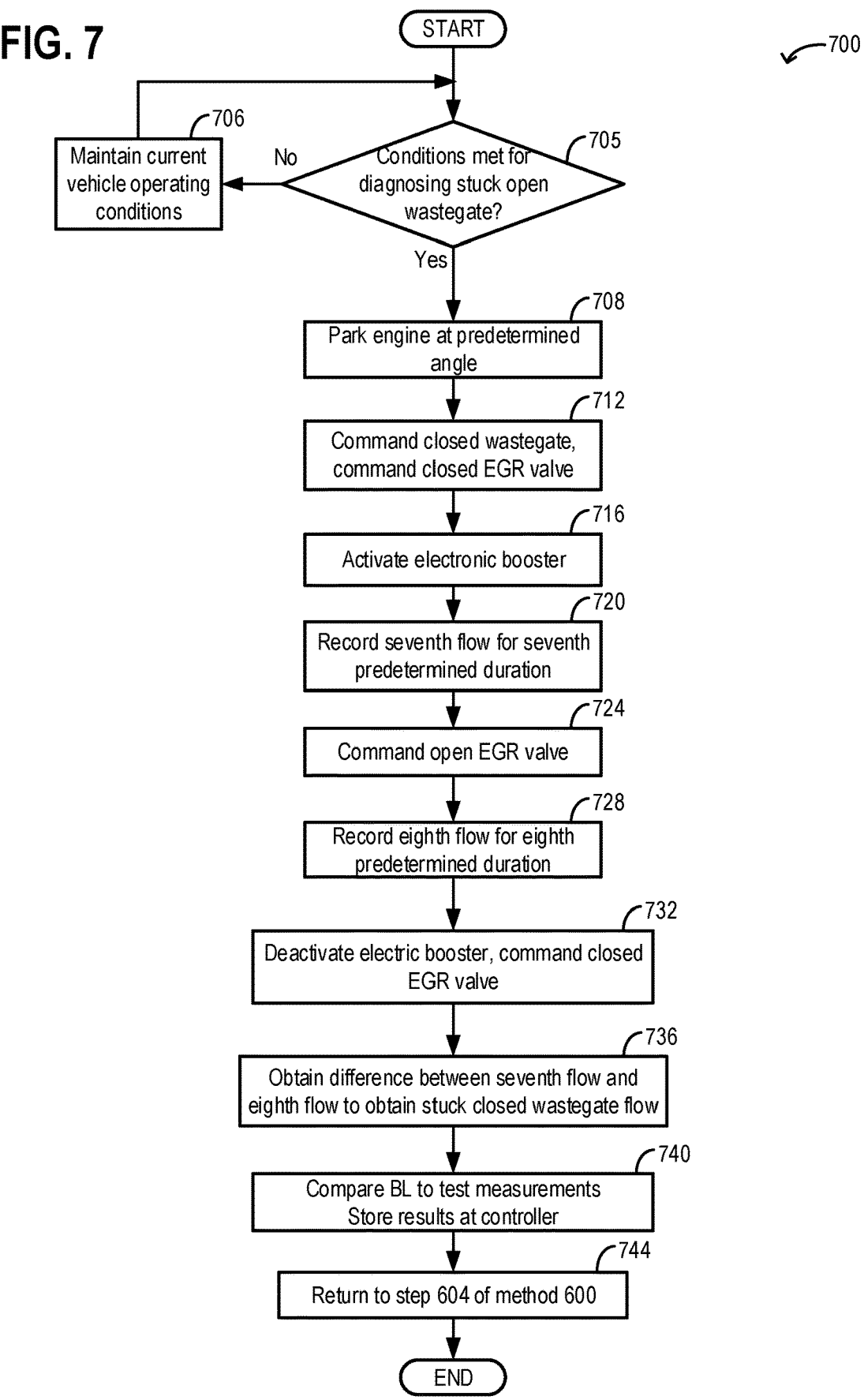
FIG. 7 shows an example method for conducting a wastegate diagnostic under conditions where the wastegate is indicated to be potentially stuck open.
Figure 8A:
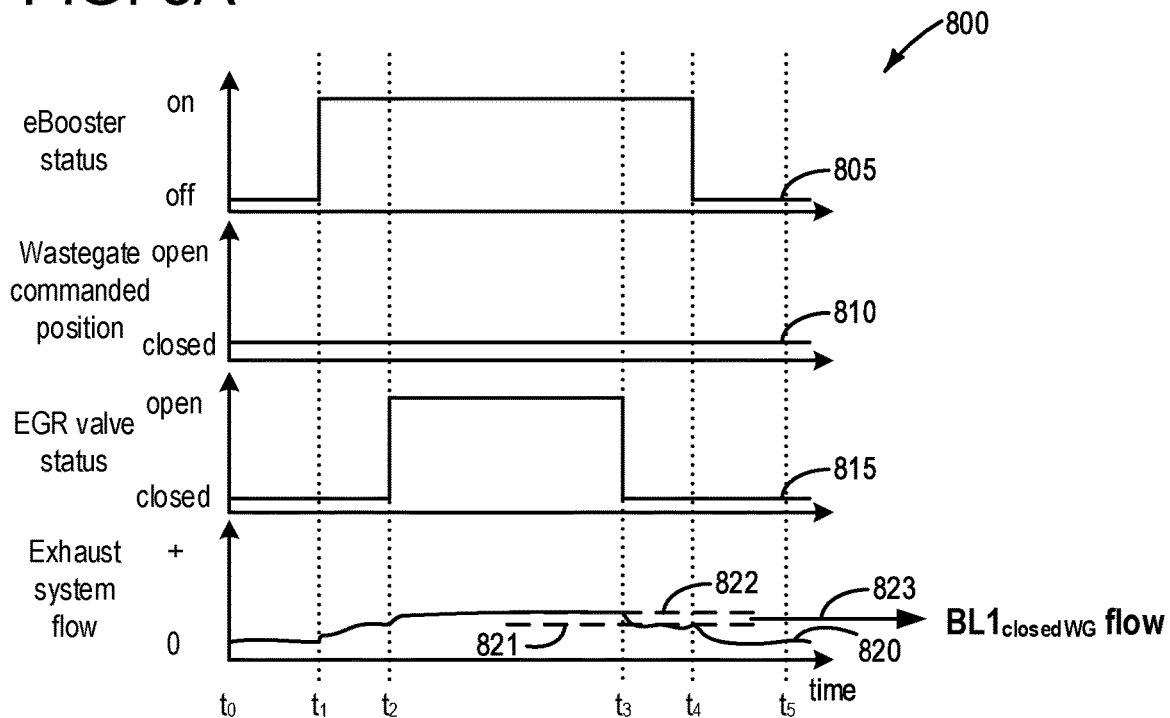
FIG. 8A depicts an example timeline for obtaining baseline air flow measurements through the engine under conditions where the wastegate is closed, according to the method of FIG. 4.
Figure 8B:
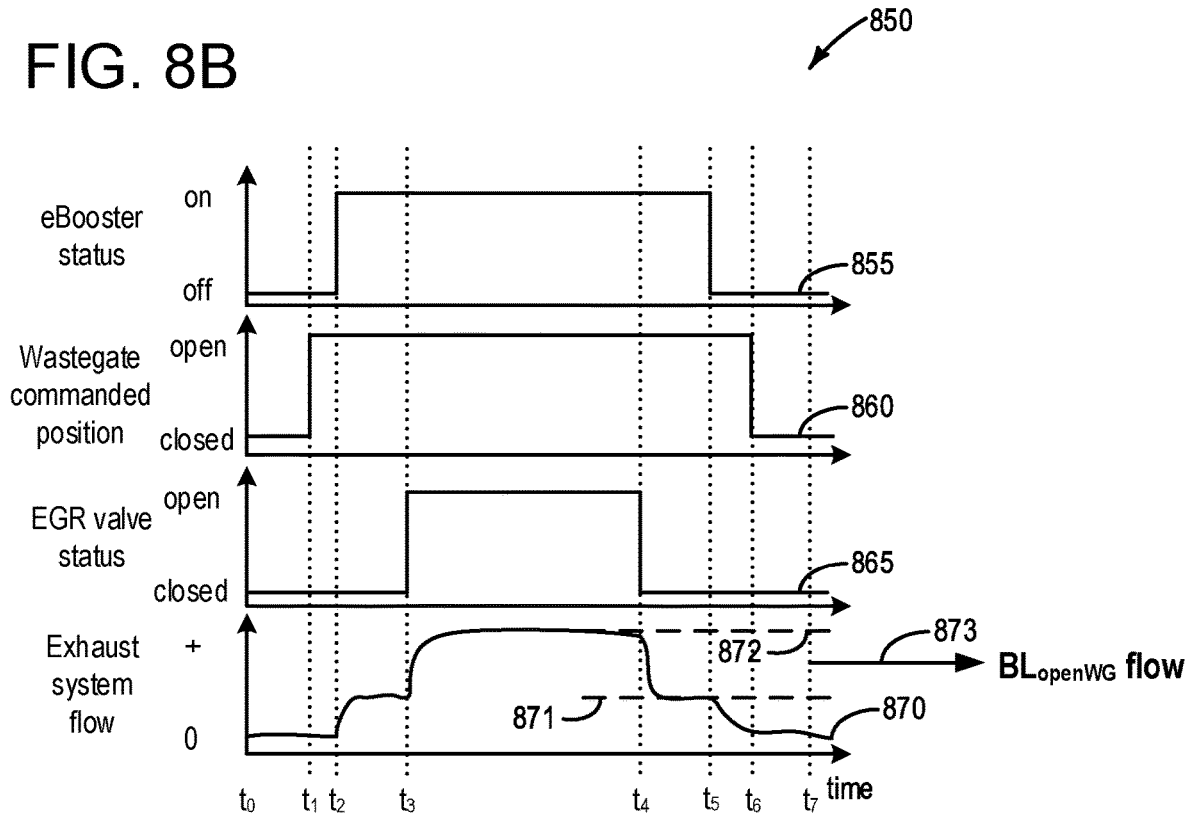
FIG. 8B depicts an example timeline for obtaining baseline air flow measurements through the engine under conditions where the wastegate is open, according to the method of FIG. 5.
Figure 9A:
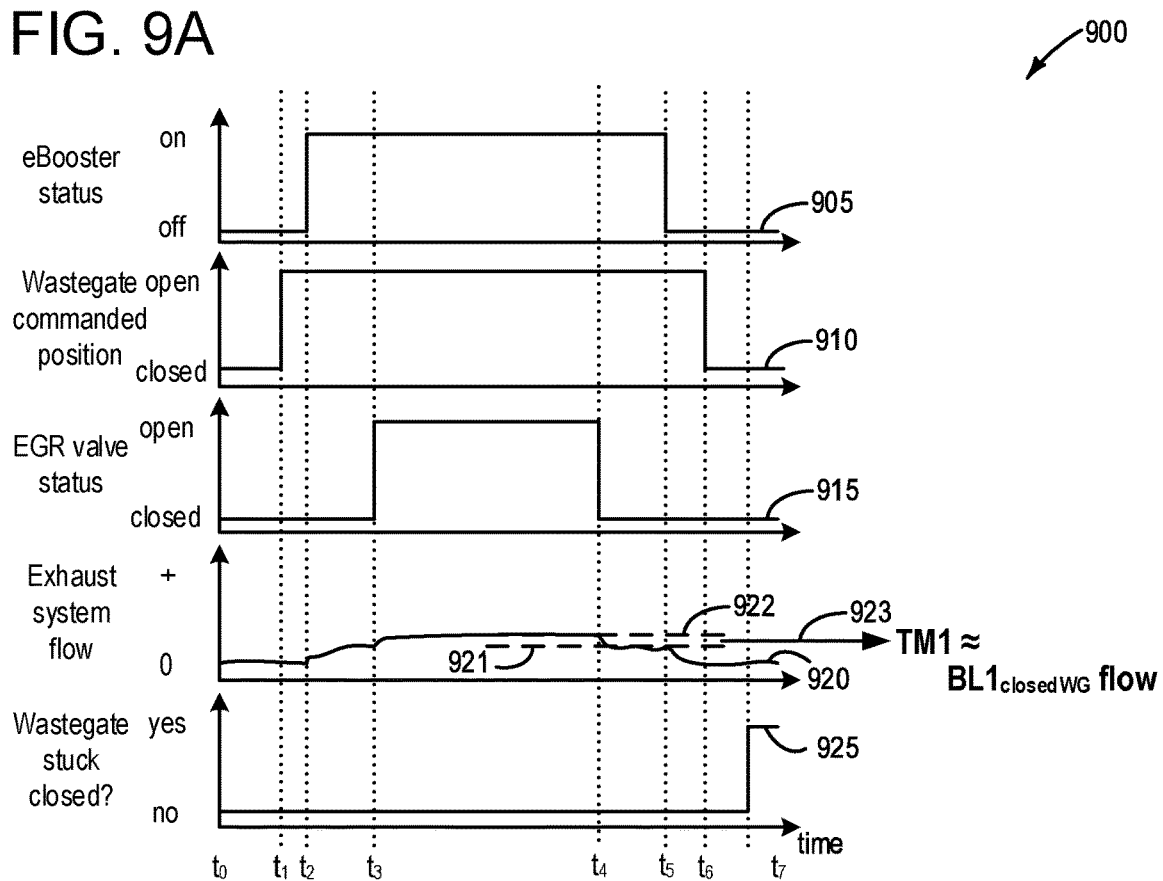
FIG. 9A depicts an example timeline for conducting a wastegate diagnostic under conditions where the wastegate is potentially stuck closed, according to the method of FIG. 6.
Figure 9B:
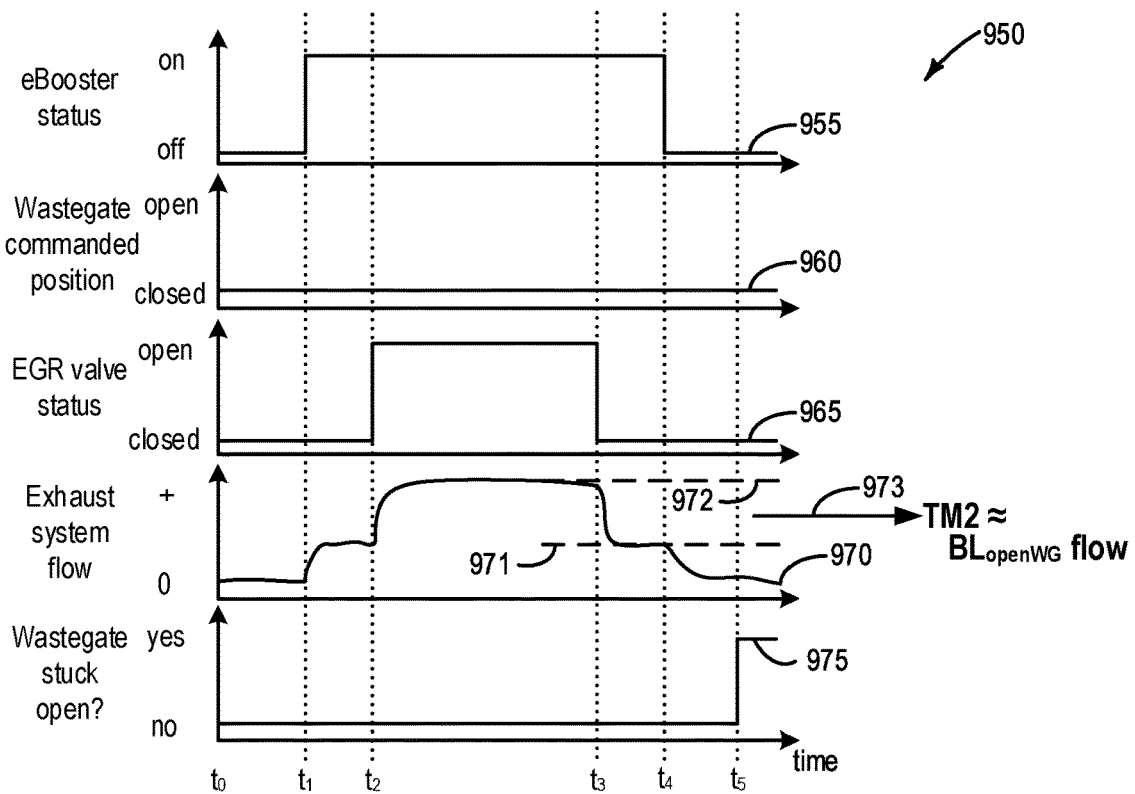
FIG. 9B depicts an example timeline for conducting a wastegate diagnostic under conditions where the wastegate is potentially stuck open, according to the method of FIG. 7.
Figure 10:
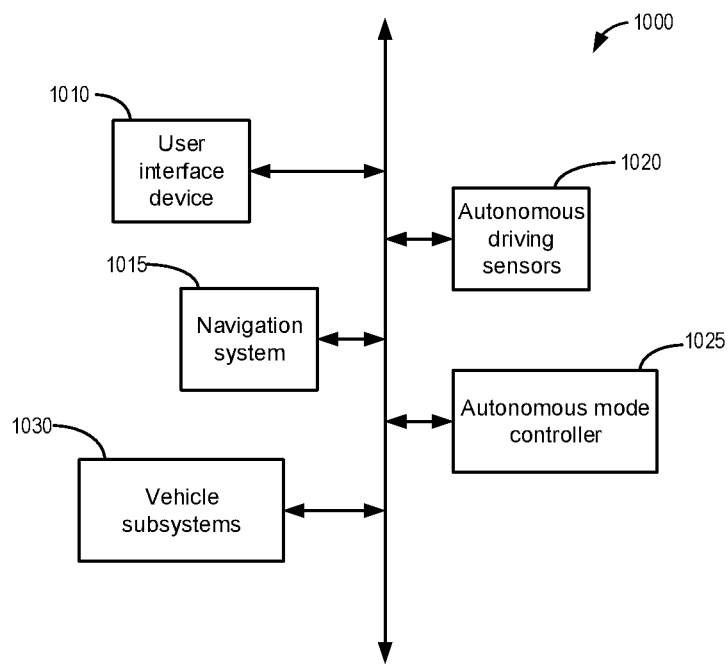
FIG. 10 schematically illustrates a block diagram of an example system for an autonomous vehicle.

The following description relates to systems and methods for conducting diagnostics on a wastegate in a vehicle, particularly with regard to a hybrid electric vehicle (HEV). Accordingly, a hybrid vehicle system is depicted at FIG. 1, where the vehicle system comprises a turbocharged vehicle, with a wastegate passage and wastegate valve. Discussed herein, wastegate valve may also be referred to simply as "wastegate". The wastegate diagnostic may be conducted under conditions where the vehicle is in an off state, based on air flow through the engine system, the air flow stemming from operation of an electric booster coupled to an intake passage of the engine, as described via the simplified block diagram of the engine system depicted at FIG. 2. Based on air flow through the engine system, it may be indicated as to whether the wastegate is in a stuck open (stuck fully open) or stuck closed (stuck fully closed), or is potentially stuck or may only open or close to an intermediate position between fully open or fully closed. To conduct such a diagnostic, baseline air flow through the engine system may first be determined under conditions where the wastegate is known to be in an open configuration, and under conditions where the wastegate is known to be in a closed configuration. Accordingly, FIG. 3 depicts an example methodology for determining whether conditions are met for obtaining such baselines, and whether conditions are met for conducting the wastegate diagnostic. FIG. 4 depicts an example methodology for obtaining baseline measurements under conditions where the wastegate is known to be in a closed configuration, and FIG. 5 depicts example methodology for obtaining baseline measurements under conditions where the wastegate is known to be in an open configuration. FIG. 6 depicts example methodology for diagnosing a potentially stuck closed wastegate, and FIG. 7 depicts example methodology for diagnosing a potentially stuck open wastegate. FIG. 8A depicts an example timeline for obtaining baseline measurements when the wastegate is closed, and FIG. 8B depicts example methodology for obtaining baseline measurements when the wastegate is open. FIG. 9A depicts an example timeline for conducting a wastegate diagnostic when it is indicated that the wastegate may potentially be stuck closed, and FIG. 9B depicts an example timeline for conducting a wastegate diagnostic when it is indicated that the wastegate may potentially be stuck open. In some examples, the diagnostic may be conducted in autonomous vehicles, such as the autonomous vehicle system depicted at FIG. 10.

Turning now to the figures, FIG. 1 shows a schematic view 101 of a vehicle system 102 with an example engine system 100 including an engine 10. The engine 10 includes an engine air intake system 162 and an engine exhaust system 163. In one example, the engine system 100 may be a diesel engine system. In another example, the engine system 100 may be a gasoline engine system. In the depicted embodiment, engine 10 is a boosted engine coupled to a turbocharger 15 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled through charge-air cooler (CAC) 118 to throttle valve 20. Throttle valve 20 is coupled to engine intake manifold 22. From the compressor, the compressed air charge flows through the charge-air cooler 118 and the throttle valve 20 to the intake manifold 22. In the embodiment shown in FIG. 1, the pressure of the air charge within the intake manifold 22 is sensed by manifold air pressure (MAP) sensor 124. In some examples, air flow in the intake manifold may be sensed via a mass air flow (MAF) sensor 121. Temperature of ambient air entering the intake passage 42 may be estimated via an intake air temperature (IAT) sensor 51.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, an ambient humidity sensor 57 may be coupled to the inlet for estimating a humidity of aircharge entering the intake manifold. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator 92 may be actuated to open wastegate 91 to dump at least some exhaust pressure from upstream of the turbine to a location downstream of the turbine via wastegate 91. By reducing exhaust pressure upstream of the turbine, turbine speed can be reduced, which in turn helps to reduce compressor surge. Wastegate 91 may be positioned in a wastegate passage 90. The methodology discussed herein utilizes a wastegate that is actuatable open and closed, however, it is herein recognized that in some examples, a spring-loaded wastegate may be included in the vehicle system. Accordingly, discussed at the end of this application is example methodology using the techniques discussed herein, to diagnose a potentially stuck open or closed spring-loaded wastegate.

To assist the turbocharger 15, an additional intake air compressor, herein also referred to as an electric booster 155 may be incorporated into the vehicle propulsion system. Electric booster 155 may be powered via an onboard energy storage device 250, which may comprise a battery, capacitor, supercapacitor, etc. The electric booster may include a compressor driven by an electric motor. A speed of operation of the electric booster may include adjusting a speed of operation of the electric motor, the electric motor operated via the on-board energy storage device 250.

Energy storage device 250 may periodically receive electrical energy from a power source 191 residing external to the vehicle (e.g., not part of the vehicle) as indicated by arrow 192. As a non-limiting example, vehicle propulsion system 100 may be configured as a plug-in hybrid electric vehicle (HEV), whereby electrical energy may be supplied to energy storage device 250 from power source 191 via an electrical energy transmission cable 193. During a recharging operation of energy storage device 250 from power source 191, electrical transmission cable 193 may electrically couple energy storage device 250 and power source 191. While the vehicle propulsion system is operated to propel the vehicle, electrical transmission cable 193 may disconnected between power source 191 and energy storage device 250. Control system 14 may identify and/or control the amount of electrical energy stored at the energy storage device, which may be referred to as the state of charge (SOC).

In other examples, electrical transmission cable 193 may be omitted, where electrical energy may be received wirelessly at energy storage device 250 from power source 191. For example, energy storage device 250 may receive electrical energy from power source 191 via one or more of electromagnetic induction, radio waves, and electromagnetic resonance. As such, it should be appreciated that any suitable approach may be used for recharging energy storage device 250 from a power source that does not comprise part of the vehicle.

In one example, electric booster 155 may be actuated in response to a demand for increased wheel torque, in order to provide the desired boost air rapidly to the engine while the turbocharger turbine spools up. As a result, the increased torque can be met without incurring the turbo lag which may otherwise have occurred if the assist from the electric booster was not available. In such an example, responsive to the turbocharger spooling up to a threshold speed (e.g. 70,000 rpm), the electric booster 155 may be actuated off, or deactivated. More specifically, operational control of the electric booster 155 may be achieved based on command signals (e.g. duty cycle or pulse width signals) received from the vehicle controller (e.g. controller 12). For example, the controller may send a signal to an electric booster actuator 155b, which may actuate on the electric booster. In another example, the controller may send a signal to the electric booster actuator 155b, which may actuate off the electric booster. In one example the electric booster actuator may comprise an electric motor which drives the compression of air.

Electric booster 155 may be positioned between a first electric booster conduit 159a, and a second electric booster conduit 159b. First electric booster conduit 159a may fluidically couple intake passage 42 to electric booster 155 upstream of electric booster bypass valve 161. Second electric booster conduit 159b may fluidically couple electric booster 155 to intake passage 42 downstream of electric booster bypass valve 161. As an example, air may be drawn into electric booster 155 via first electric booster conduit 159a upstream of electric booster bypass valve 161, and compressed air may exit electric booster 155 and be routed via second electric booster conduit to intake passage 42 downstream of electric booster bypass valve 161. In this way, compressed air may be routed to engine intake 22.

In circumstances where the electric booster 155 is activated to provide boost more rapidly than if the turbocharger 15 were solely relied upon, it may be understood that electric booster bypass valve 161 may be commanded closed while electric booster 155 is activated. In this way, intake air may flow through turbocharger 15 and through electric booster 155. Once the turbocharger reaches the threshold speed, the electric booster 155 may be turned off, and the electric booster bypass valve 161 may be commanded open.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance. While in this example illustration, a camshaft is not illustrated, one or more camshaft sensors 199 may be included in the vehicle propulsion system. Furthermore, crankshaft 174 may include crankshaft sensor 197. In some examples, one or both of crankshaft sensor 197 and/or camshaft sensors 199 may be utilized to infer a position of one or more pistons coupled to the engine cylinders 30.

Combustion chambers 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections may be directed to turbine 116 to drive the turbine. The combined flow from the turbine and the wastegate then flows through emission control device 170. In one example, the emission control device 170 may be a light-off catalyst. In general, the exhaust after-treatment device 170 is configured to catalytically treat the exhaust flow, and thereby reduce an amount of one or more substances in the exhaust flow. For example, the exhaust after-treatment device 170 may be configured to trap $NO_x$ from the exhaust flow when the exhaust flow is lean, and to reduce the trapped $NO_x$ when the exhaust flow is rich. In other examples, the exhaust after-treatment device 170 may be configured to disproportionate $NO_x$ or to selectively reduce $NO_x$ with the aid of a reducing agent. In still other examples, the exhaust after-treatment device 170 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

Engine exhaust system 163 may further include a gasoline particulate filter (GPF) 164. GPF 164 may comprise a particulate filter, hydrocarbon trap, a catalyzed wash coat, or combination thereof. In some examples, during operation of engine 10, GPF 164 may be periodically regenerated by operating at least one cylinder of the engine within a particular air-fuel ratio to increase a temperature of GPF 164, such that retained hydrocarbons and soot particles may be oxidized.

In some examples, temperature sensor 166 may be positioned upstream from the inlet of GPF 217 and temperature sensor 167 may be positioned downstream of GPF 164. Temperature sensors 166 and 167 may be used to assess the temperature of GPF 164 for regeneration purposes, for example. Furthermore, pressure in the exhaust system may be assessed by pressure sensor 165. Pressure sensor 165 may be a differential pressure sensor positioned upstream (closer to exhaust manifold) and downstream (farther from exhaust manifold) of GPF 164, for example. Pressure sensor 165 may be used to determine pressure at the inlet of GPF 164 in order to assess operating conditions for air to be introduced to the inlet of GPF 164 for regeneration. Furthermore, in some examples, a soot sensor may be positioned downstream of GPF 164, to assess the level of soot that is released from GPF 164.

Exhaust gas recirculation (EGR) delivery passage 180 may be coupled to the exhaust passage 104 upstream of turbine 116 to provide high pressure EGR (HP-EGR) to the engine intake manifold, downstream of compressor 114. An EGR valve 152 may be coupled to the EGR passage 180 at the junction of the EGR passage 180 and the intake passage 42. EGR valve 152 may be opened to admit a controlled amount of exhaust to the compressor outlet for desirable combustion and emissions control performance. EGR valve 152 may be configured as a continuously variable valve or as an on/off valve. In further embodiments, the engine system may include a low pressure EGR (LP-EGR) flow path wherein exhaust gas is drawn from downstream of turbine 116 and recirculated to the engine intake manifold, upstream of compressor 114.

One or more sensors may be coupled to EGR passage 180 for providing details regarding the composition and condition of the EGR. For example, a temperature sensor 168 may be provided for determining a temperature of the EGR, a pressure sensor 169 may be provided for determining a pressure of the EGR, a humidity sensor (not shown) may be provided for determining a humidity or water content of the EGR, and an air-fuel ratio sensor (not shown) may be provided for estimating an air-fuel ratio of the EGR. Alternatively, EGR conditions may be inferred by the one or more temperature, pressure, humidity, and air-fuel ratio sensors coupled to the compressor inlet.

A plurality of sensors, including an exhaust temperature sensor 128, an exhaust oxygen sensor (e.g. 126), an exhaust flow sensor, and exhaust pressure sensor 129 may be coupled to the main exhaust passage 104. The oxygen sensor may be linear oxygen sensors or UEGO (universal or wide-range exhaust gas oxygen), two-state oxygen sensors or EGO, HEGO (heated EGO), a NOx, HC, or CO sensors.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas sensor 126 located upstream of the turbine 116, MAP sensor 124, exhaust temperature sensor 128, exhaust pressure sensor 129, compressor inlet temperature sensor 55, compressor inlet pressure sensor 56, ambient humidity sensor 57, IAT sensor 51, engine coolant temperature sensor, etc. Other sensors such as additional pressure, temperature, air/fuel ratio, and composition sensors may be coupled to various locations in engine system 100. In addition, sensors coupled to the exterior of the vehicle system such as the rain sensor (windshield sensor) 130 may be used to estimate ambient humidity.

The actuators 18 may include, for example, electric booster bypass valve 161, throttle 20, electric booster actuator 155b, EGR valve 152, wastegate actuator 92, and fuel injector 66. The control system 14 may include a controller 12. The controller 12 may receive input data from the various sensors, process the input data, and trigger various actuators in response to the processed input data based on instruction or code programmed therein corresponding to one or more routines.

The controller 12 may be coupled to a wireless communication device 156 for direct communication of the vehicle 102 with a network cloud 160. Using the wireless communication 150 via the device 156, the vehicle 102 may retrieve data regarding current and/or upcoming ambient conditions (such as ambient humidity, temperature, pressure, etc.) from the network cloud 160. At completion of a drive cycle, the database 13 within the controller 12 may be updated with route information including driver behavioral data, engine operating conditions, date and time information, and traffic information. Furthermore, in some examples, controller may be in communication with a remote engine start receiver (or transceiver) that receives wireless signals from a key fob having a remote start button, the remote start button actuated by a vehicle operator from a location that is remote from the vehicle location. In other examples (not shown), a remote engine start may be initiated via a cellular telephone, or smartphone based system where a user's cellular telephone sends data to a server and the server communicates with the vehicle to start the engine.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode, or a remote start event may trigger a return to an awake mode.

In some examples, vehicle 102 may be a hybrid vehicle with multiple sources of torque available to one or more vehicle wheels 171. In other examples, vehicle 102 is a conventional vehicle with only an engine, or an electric vehicle with only electric machine(s). In the example shown, vehicle 102 includes engine 10 and an electric machine 52. Electric machine 52 may be a motor or a motor/generator. Crankshaft 174 of engine 10 and electric machine 52 are connected via a transmission 54 to vehicle wheels 171 when one or more clutches 172 are engaged. In the depicted example, a first clutch is provided between crankshaft 174 and electric machine 52, and a second clutch is provided between electric machine 52 and transmission 54. Controller 12 may send a signal to an actuator of each clutch 172 to engage or disengage the clutch, so as to connect or disconnect crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 171. Electric machine 52 may also be operated as a generator to provide electrical power to charge traction battery 58, for example during a braking operation.

In some examples, a fuel economy gauge 194 may indicate fuel efficiency, to indicate whether fuel efficiency is degraded as a result of degradation in the vehicle system (e.g. stuck open wastegate).

In still other examples, vehicle propulsion system 100 may include one or more onboard cameras 195. Onboard cameras 195 may communicate photos and/or video images to control system 14, for example. Onboard cameras may in some examples be utilized to record images within a predetermined radius of the vehicle, for example.

In one example, the one or more onboard cameras 195 may be included in a vehicle exhaust smoke identification system 196. In some examples, the vehicle exhaust smoke identification system 196 may include a video processing data unit. In one example, the video processing unit may comprise controller 12, but in other examples the video processing unit may include a control computing device what is separate from, but which may be selectively electrically coupled to (or wirelessly coupled to), controller 12. In one example, the vehicle exhaust smoke identification system 196 may include a method for color recognition. In other words, the vehicle exhaust smoke identification system may include a computer vision system. In one example, the color recognition method may include storing a predefined set of colors in memory, and determining whether exhaust smoke comprises a particular color. For example, the color recognition method may include indicating whether the exhaust smoke is white, gray, black, blue-black, etc. In some examples, a confidence value may be associated with the color determination. For example, an exhaust smoke that is identified to be black may comprise a high confidence value, a mid-level confidence value, or a low-confidence value. Alternatively, a numerical system may be utilized to assign confidence value(s) to particular color determinations. For example, the numerical system may comprise numbers 1-10, or 1-100. Confidence values may increase as confidence in a particular color determination increase, and may decrease as confidence in particular color determination decrease. In some examples, a determination that the exhaust smoke is "black" may comprise the smoke being substantially black, or within a threshold of a determination that the smoke is black. More specifically, substantially black may comprise a determination that the smoke is within a predetermined threshold of being black (e.g. within a 5% margin of error or within a 10% margin of error, for example). In this way, it may be accurately determined as to the color of exhaust gas exiting the vehicle, as will be discussed in further detail below.

In some examples, vehicle propulsion system 100 may include sensors 198 dedicated to indicating the occupancy-state of the vehicle, for example seat load cells, door sensing technology, and/or onboard cameras.

Figure 2:
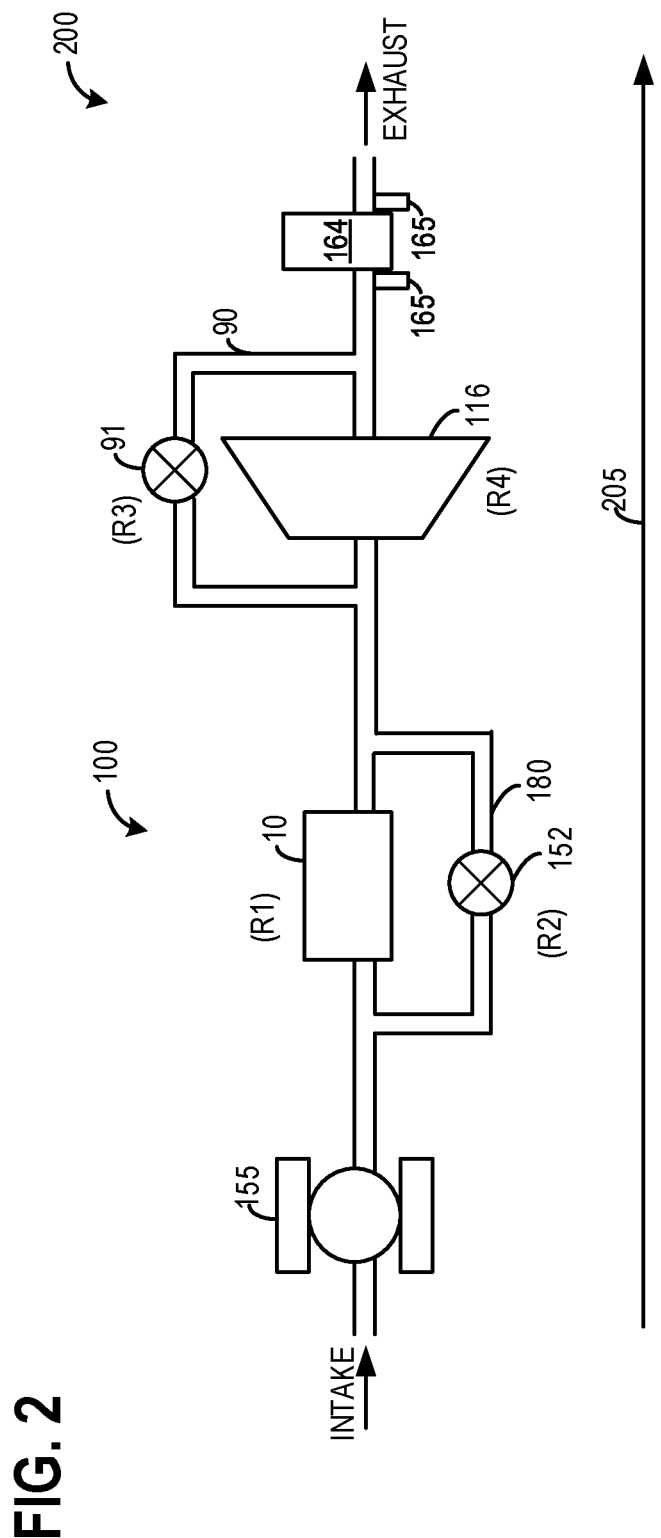
FIG. 2 schematically illustrates a simplified depiction of the vehicle system illustrated at FIG. 1.

Turning now to FIG. 2, a simplified illustration 200 is shown, depicting the main relevant components of vehicle system 100 as a block diagram. Components illustrated comprise the same numerals as their counterparts depicted at FIG. 1. Specifically, illustration 200 includes electric booster 155, positioned upstream from engine 10. EGR delivery passage 180, including EGR valve 152 is illustrated as positioned upstream of turbine 116. A wastegate passage 90 includes wastegate 91. Turbine 116 is upstream of where exhaust gas exits the vehicle system. Furthermore, GPF 164 and its associated pressure sensor 165 is depicted downstream of turbine 116.

As discussed, there may be circumstances where wastegate 91 becomes stuck closed, or stuck open. Accordingly, the following methodology may be used to diagnose a stuck closed or stuck open wastegate. Specifically, under circumstances where it is known or inferred that the wastegate is functioning as desired, baseline measurements may be obtained. Such baseline measurements may comprise baseline measurements of air flow in the general direction of arrow 205, as will be described in further detail below.

Specifically, a first baseline measurement may be obtained with the wastegate 91 in a closed configuration (e.g. fully, or completely closed). First, when the vehicle is not in operation, engine 10 may be parked at a predetermined angle, or predetermined position, for example within a predetermined number of degrees from top dead center (TDC) for a cylinder of the engine. In this way, an intake valve and an exhaust valve of the cylinder parked at TDC may each be at least partially open, such that air may flow from the intake manifold (e.g. 22) to exhaust manifold (e.g. 36) through the engine. EGR valve 152 may be commanded closed. Similarly, wastegate 91 may be commanded closed. Next, the electric booster may be commanded on, to direct compressed air in the direction of arrow 205. As indicated, engine 10, EGR valve 152, wastegate 91, and turbine 116 may be conceptualized of as resistors, specifically R1, R2, R3, and R4, respectively. When the EGR valve is closed, it resists air flow, such that air flow derived from the electric booster may be routed through the engine. Similarly, when the wastegate is closed, it resists air flow, such that air flow derived from the electric booster may be routed through the turbine 116. Accordingly, with the ebooster activated and the EGR valve and wastegate closed, air may be directed through engine 10 and turbine 116. By monitoring air flow via the pressure sensor 165, a first flow may be determined.

Next, the EGR valve may be commanded open. With the EGR valve commanded open, air derived from the electric booster may be directed around engine 10, through EGR passage 180 via open EGR valve 152. In other words, the resistance to air flow through the engine is greater than the resistance to air flow via EGR passage 180, such that air may predominantly flow through EGR passage 180. However, because wastegate 91 is closed, air may still be directed through turbine 116, which may resist air flow. Such flow may be monitored via pressure sensor 165, to provide a second flow. The difference between the first flow and the second flow may comprise a first baseline flow, also referred to herein as $BL1_{closedWG}$ flow, or simply BL1 flow. Such a measurement may be stored at the controller, and with the first baseline flow measurement has been obtained, the electric booster may be commanded off, and the EGR valve may be commanded closed.

A second baseline measurement may be obtained with the wastegate 91 in an open configuration (e.g. fully, or completely open). First, when the vehicle is not in operation, engine 10 may again be parked at the predetermined angle (e.g. within a predetermined number of degrees from TDC for a cylinder of the engine. As above, EGR valve 152 may be commanded closed, but wastegate 91 in this case may be commanded open. Next, the electric booster may be commanded on, to direct compressed air in the direction of arrow 205. With the EGR valve closed, air may be routed through engine 10. However, rather than being directed through turbine 116, due to the open status of wastegate 91 air may be routed around turbine 116 and through wastegate passage 90 via open wastegate 91. In other words, the resistance of the turbine 116 (R4) may be much greater than the resistance of wastegate passage 90, when wastegate 91 is open. By monitoring air flow via pressure sensor 165, a third flow may be determined, where third flow comprises air flow predominantly through engine 10 and wastegate 91.

Next, similar to that described above, EGR valve may be commanded open. With the EGR valve commanded open, air derived from the electric booster may be directed around engine 10, through EGR passage 180 via open EGR valve 152, as the resistance to air flow through the engine is greater than that of the EGR passage. Further, because wastegate 91 is open, the air derived from the electric booster may be routed around turbine 116. Such flow may be monitored via pressure sensor 165, to provide a fourth flow. The difference between the first flow and the second flow may comprise a second baseline flow, also referred to herein as $BL2_{openWG}$ flow, or simply BL2 flow. Such a measurement may be stored at the controller, and with the second baseline flow measurement obtained, the electric booster may be commanded off, and the EGR valve and wastegate may be commanded closed.

With the first baseline flow ($BL1_{closedWG}$ flow) and second baseline flow ($BL2_{openWG}$ flow) determined, there may be situations where it may be desirable to conduct a diagnostic to determine whether the wastegate is stuck open or closed. Specifically, a stuck open wastegate may result in low boost, poor fuel economy, and/or smoke being emitted from the exhaust system. Alternatively, a stuck closed wastegate may result in inaccurate boosting, engine overheating, and/or turbo overspeed conditions.

In a situation where it is indicated that the wastegate may potentially be stuck closed, the following procedure may be utilized. During conditions where the vehicle is not in operation, the engine may be controlled such that a cylinder may be parked within the predetermined angle from TDC. The wastegate may be commanded open, and the EGR valve may be commanded closed. The electric booster may then be commanded on. With the electric booster commanded on, and with the wategate open and the EGR valve closed, a fifth flow may be determined, via pressure sensor 165. Next, the EGR valve may be commanded open, and a sixth flow may be indicated via pressure sensor 165. The difference between the fifth flow and the sixth flow may comprise a first test measurement flow, also referred to herein as TM1 flow. If the wastegate is functioning as desired, TM1 flow may be expected to be within a threshold (e.g. within 5%) of second baseline flow ($BL2_{openWG}$ flow). However, if instead the wastegate is stuck closed (where commanding the wastegate open did not result in opening of the wastegate), then instead TM1 flow as monitored via pressure sensor 165 may be expected to be within a threshold (e.g. within 5%) of first baseline flow ($BL1_{closedWG}$ flow). In some examples, if the flow is not within the threshold of second baseline flow or first baseline flow, it may be indicated that the wastegate is stuck in an intermediate position or only opening to an intermediate position.

Alternatively, in a situation where it is indicated that the wastegate may potentially be stuck open, the following related procedure may be utilized. During conditions where the vehicle is not in operation, the engine may be controlled such that a cylinder may be parked within the predetermined angle from TDC. The wastegate may be commanded closed, and the EGR valve may be commanded closed. The electric booster may be commanded on. With the electric booster commanded on, and with the wastegate and EGR valve both closed, a seventh flow may be determined, via pressure sensor 165. Next, the EGR valve may be commanded open, and an eighth flow may be indicated via pressure sensor 165. The difference between the seventh flow and the eighth flow may comprise a second test measurement flow, or TM2 flow. If the wastegate is functioning as desired, TM2 flow may be expected to be within the threshold (e.g. within 5%) of first baseline flow ($BL1_{closedWG}$ flow). However, if instead the wastegate is stuck open, then instead air flow as monitored via pressure sensor 165 may be expected to be within the threshold (e.g. within 5%) of second baseline flow ($BL2_{openWG}$ flow). As discussed, in some examples if the flow is not within the threshold of second baseline flow or first baseline flow, it may be indicated that the wastegate is stuck in an intermediate position or is only capable of closing to an intermediate position.

Thus, a system for a hybrid electric vehicle comprises an engine an engine positioned in an engine system, the engine system including an intake and an exhaust system; an exhaust gas recirculation passage including an exhaust gas recirculation valve; a turbine positioned in the exhaust system, the turbine mechanically coupled to a compressor in the intake; a wastegate valve positioned in a wastegate passage, the wastegate passage in parallel with the turbine; an electric compressor positioned in the intake; and a differential pressure sensor positioned in the exhaust system downstream of the turbine. The system may further include a controller storing instructions in non-transitory memory that, when executed cause the controller to obtain a first baseline air flow through the engine system via activating the electric compressor with the wastegate valve commanded closed and indicate a difference between a first air flow and a second air flow as monitored via the differential pressure sensor, the first air flow obtained with the exhaust gas recirculation valve closed and the second air flow obtained with the exhaust gas recirculation valve open. The controller may include further instructions to obtain a second baseline air flow through the engine system via activating the electric compressor with the wastegate valve commanded open and indicate a difference between a third air flow and a fourth air flow as monitored via the differential pressure sensor, the third air flow obtained with the exhaust gas recirculation valve closed and the second air flow obtained with the exhaust gas recirculation valve open. The controller may include further instructions to, in response to an indication that the wastegate is potentially stuck closed, command open the wastegate valve and obtain a first test measurement air flow via activating the electric compressor to determine a difference between a fifth air flow obtained with the exhaust gas recirculation valve closed and a sixth air flow obtained with the exhaust gas recirculation valve open, or in response to an indication that the wastegate is potentially stuck open, command the wastegate valve closed and obtain a second test measurement air flow via activating the electric compressor to determine a difference between a seventh air flow obtained with the exhaust gas recirculation valve closed and an eighth air flow obtained with the exhaust gas recirculation valve open.

In one example of the system, the controller may store further instructions to indicate that the wastegate valve is stuck closed in response to the first test measurement air flow being within a first threshold of the first baseline air flow; indicate that the wastegate valve is stuck open in response to the second test measurement being within a second threshold of the second baseline air flow; and indicate that the wastegate valve is degraded in response to the first test measurement air flow not within the first threshold of the first baseline air flow or the second threshold of the second baseline air flow, or in response to the second test measurement air flow not within the first threshold of the first baseline air flow or the second threshold of the second baseline air flow.

In another example of the system, the system may further comprise a motor configured to rotate the engine, and wherein obtaining the first baseline air flow, the second baseline air flow, the first test measurement air flow and the second test measurement air flow further includes positioning the engine at a predetermined position prior to activating the electric compressor, the predetermined position including a predetermined piston of a predetermined cylinder of the engine within a threshold number of degrees from a top dead center position.

The system described above may also enable a method comprising in response to an indication that a vehicle equipped to charge an onboard energy storage device via an electrical connection to an electrical grid is experiencing degradation of an engine in an engine system of the vehicle, the degradation potentially related to an issue with a wastegate coupled to an exhaust system of the engine, and further responsive to an indication that the vehicle is plugged in to the electrical grid: obtaining a test measurement of air flow through the engine system via activating an electric compressor positioned in an intake of the engine to direct air flow through the engine system, where the test measurement of air flow is monitored via a differential pressure sensor positioned downstream of a turbine in the exhaust system, the turbine coupled to a mechanical compressor upstream of the electric compressor; and indicating whether the wastegate is functioning as desired by comparing the test measurement of air flow to one or more baseline air flow measurements obtained under similar circumstances as the test measurement at an earlier time.

In one example of the method, the differential pressure sensor is coupled to a gasoline particulate filter.

In another example of the method, the one or more baseline air flow measurements include a first baseline air flow measurement and a second baseline air flow measurement, where the first baseline air flow measurement is obtained under conditions where the wastegate is commanded fully closed, and where the second baseline air flow measurement is obtained under conditions where the wastegate is commanded fully open. The first baseline air flow measurement may include a difference between air flow through the engine and through the turbine as compared to air flow around the engine and through the turbine. The second baseline air flow measurement includes a difference between air flow through the engine and around the turbine as compared to air flow around the engine and around the turbine. In some examples of such a method, the test measurement of air flow may include either a first test measurement or a second test measurement, the first test measurement including the wastegate commanded to the fully open position and the second test measurement including the wastegate commanded to the fully closed position. In such an example, both the first test measurement and the second test measurement may involve determining a difference between at least air flow through the engine as compared to air flow around the engine. Furthermore, in such a method, the first test measurement may be obtained under conditions where degradation of the engine includes indications of one or more of inaccurate boost, a turbo overspeed condition, and/or engine overheating, and the second test measurement may be obtained under conditions where degradation of the engine includes indication of one or more of low boost, degraded fuel economy, and or indications of black smoke being emitted from the exhaust system.

In another example of the method, air flow through the engine may include an exhaust gas recirculation valve positioned in an exhaust gas recirculation passage being commanded to a fully closed position, and wherein air flow around the engine includes the exhaust gas recirculation valve commanded to a fully open position.

In yet another example of the method, activating the electric compressor may include activating the electric compressor to a predetermined speed or predetermined power level.

Accordingly, turning now to FIG. 3, a high-level example method 300 for determining whether a wastegate is functioning as desired, or is stuck open or closed (e.g. stuck fully open, stuck fully closed, or stuck in an intermediate position between fully open and fully closed), is shown. More specifically, method 300 depicts how the baseline measurements described above may be obtained, and what conditions may result in the conducting of a wastegate diagnostic procedure as described above, which relies on the baseline measurements. Method 300 will be described in reference to the systems described in FIGS. 1-2, though it should be understood that method 300 may be applied to other systems without departing from the scope of this disclosure. Method 300 may be carried out by a controller, such as controller 12, and may be stored as executable instructions in non-transitory memory. Instructions for carrying out method 300 and the rest of the methods included herein may be executed by the controller based on instructions stored on a memory of the controller and in conjunction with signals received from sensors of the vehicle system, such as the sensors described above with reference to FIGS. 1-2. The controller may employ engine system actuators such as motor (e.g. 52), EGR valve (e.g. 152), electric booster (e.g. 155), wastegate (e.g. 91), etc., according to the methods depicted below.

Method 300 begins at 302, and may include obtaining baseline measurements (e.g. first baseline flow ($BL1_{closedWG}$ flow) and/or second baseline flow ($BL2_{openWG}$ flow), according to the process flow depicted at FIGS. 4-5. More specifically, FIG. 4 depicts example methodology for obtaining the first baseline flow, while FIG. 5 depicts example methodology for obtaining the second baseline flow. Such methods will be discussed in greater detail below.

With the baseline measurements obtained, method 300 may proceed to 306. At 306, method 300 may include monitoring for vehicle symptomology that may be indicative of a wastegate that is degraded, or in other words, that is not functioning as desired. As alluded to above at FIG. 2, there may be one or more symptoms that may be indicative of a wastegate that is stuck open, and one or more symptoms that may be indicative of a wastegate that is stuck closed.

As a first example, consider a stuck open wastegate. Because the wastegate regulates maximum boost, boost suffers when the wastegate remains open, as exhaust gas is preferentially routed around the turbine (e.g. 116). The exhaust gases then exit the exhaust, resulting in a lack of boost pressure, and reduction in engine power. Such an indication may be observable as poor engine performance upon a request to accelerate, for example. In another example, a stuck open wastegate may result in degradation of fuel economy (fuel efficiency that is lower than desired or expected). Such an example may be provided via a fuel efficiency gauge (e.g. 194), for example. In still another example, a stuck open wastegate may result in the engine burning too much fuel, which, in addition to the degradation of fuel economy, may result in black smoke being emitted from the exhaust system. Thus, in some examples, an onboard camera (e.g. 195) may be utilized to indicate whether a smoke exiting the exhaust is black, as discussed above at FIG. 1.

In another example, consider a stuck closed wastegate. Because the wastegate is unable to open, vehicle performance may suffer, and costly engine degradation may result. One such indication of a stuck closed wastegate may comprise an indication of inaccurate boosting, leading to back pressure in the engine. Such an example may be indicated via a pressure sensor (e.g. 124) coupled to the engine. In another example, a stuck closed wastegate may result in engine overheating. In other words, as a result of backpressure due to the stuck closed wastegate, the engine may overheat which may result in degradation of cylinder pistons, piston rings, rod bearings, head gasket, radiator, etc. In yet other examples, turbo overspeed conditions may result from a stuck closed wastegate, which may result in degradation of the turbine, compressor, etc.

Thus, at 306, the above-mentioned conditions may be monitored so as to indicate whether there is a possibility that the wastegate is not functioning as desired (e.g. stuck open or closed) at step 308. If, at 308, potential adverse wastegate issues are not indicated, method 300 may proceed to 312. At 312, method 300 may include indicating whether a threshold has elapsed since prior baseline measurements (e.g. first baseline flow ($BL1_{closedWG}$ flow) and/or second baseline flow ($BL2_{openWG}$ flow) were obtained. The threshold may comprise a predetermined duration of time (e.g. 20 days, 30 days, 60 days, etc.) elapsing since prior baseline measurements were obtained, or may comprise a predetermined number of miles (e.g. every 1000, or every 2000, or every 3000 miles). If, at 312, the threshold duration or threshold number of miles has not elapsed, method 300 may return to 306, and may include continuing to monitor for symptoms of potential wastegate degradation.

Alternatively, responsive to an indication at 312 that the threshold duration or number of miles driven has elapsed since previous baseline measurements, method 300 may proceed to 316, and may include updating the BL measurements according to the process flow of FIGS. 4-5. With the new measurements obtained at 316, method 300 may proceed to 320 and may include storing the new or updated baseline measurements at the controller, for use in conducting a wastegate diagnostic in response to indications of potential wastegate degradation, as discussed. With the new BL measurements obtained at 320, method 300 may return to 306, where symptoms may continue to be monitored.

Accordingly, returning to 308, responsive to an indication of a potential wastegate issue, method 300 may proceed to 324. At 324, method 300 may include conducting a wastegate diagnostic procedure. Accordingly, at 324, method 300 may include proceeding to FIG. 6. If the symptoms indicated at 308 are indicative of a stuck closed wastegate, then method 600 may be conducted. Alternatively, if the symptoms indicated at 308 are indicative of a stuck open wastegate, then the diagnostic may be conducted according to FIG. 7. Such procedures for conducting wastegate diagnostics have been described at a high-level with regard to FIG. 2, and are thus further elaborated at FIGS. 6-7.

Returning to 324, responsive to the wastegate diagnostic being conducted and results determined, method 300 may proceed to 328. At 328, method 300 may include updating vehicle operating parameters as a function of the results of the wastegate diagnostic procedure conducted. For example, responsive to an indication that the wastegate is stuck in a substantially open (e.g. within a predetermined percentage (e.g. 5%) of fully open), fully open, fully closed, or substantially closed (e.g. within a predetermined percentage (e.g. 5%) of fully closed), method 300 may include setting a malfunction indicator light at the vehicle dash, to alert a vehicle operator of a request to service the vehicle. In some examples, at 328, updating vehicle operating parameters may include taking mitigating actions to prevent engine degradation as a result of the wastegate degradation. For example, taking mitigating actions may include the controller commanding the vehicle system to operate as frequently as reasonably possible in an electric-only mode of operation. By operating in an electric-only mode as frequently as possible, engine degradation may be reduced or avoided until the vehicle is serviced. Method 300 may then end.

With regard to method 300, it may be understood that such a method may not take place in one drive cycle, but may involve methodology that proceeds over a number of drive cycles, where a drive cycle may include a key-on event followed by a key-off event, or similar equivalent. For example, baseline measurements may conducted when the vehicle is not in operation, for example at a remote start event where a vehicle operator and/or passengers are not indicated to be in the vehicle. Such indications may be provided, for example, via seat load sensors (e.g. 198). Another example may include a wakeup of the controller hours (e.g. 6 hours) after a key-off event. Another example may include a situation where the vehicle comprises an autonomous vehicle (see FIG. 10), where no customers/vehicle operator(s)/passengers are indicated to be in the vehicle. Alternatively, monitoring for symptoms of wastegate degradation may be conducted while the vehicle is in operation (e.g. while the engine is combusting air and fuel).

Thus, it may be understood that at 312 of method 300 for example, if the threshold duration or number of miles elapses, updating the baseline measurements at 316 may include scheduling the procedure for obtaining baseline measurements, at a subsequent engine-off/vehicle-off condition, where the procedure may then be conducted responsive to conditions being met for the procedure, as will be elaborated on with regard to FIGS. 4-5.

Turning now to FIG. 4, a high-level example method 400 for obtaining the first baseline flow ($BL1_{closedwG}$ flow) measurements as discussed above, is shown. Method 400 will be described in reference to the systems described in FIGS. 1-2, though it should be understood that method 400 may be applied to other systems without departing from the scope of this disclosure. Method 400 may be carried out by a controller, such as controller 12, and may be stored as executable instructions in non-transitory memory. Instructions for carrying out method 400 and the rest of the methods included herein may be executed by the controller based on instructions stored on a memory of the controller and in conjunction with signals received from sensors of the vehicle system, such as the sensors described above with reference to FIGS. 1-2. The controller may employ engine system actuators such as motor (e.g. 52), EGR valve (e.g. 152), electric booster (e.g. 155), wastegate (e.g. 91), etc., according to the methods depicted below.

Method 400 begins at 402, and may include indicating whether conditions are met for obtaining the first baseline flow with the wastegate (e.g. 91) closed. In one example, conditions being met may include an indication that the engine has passed original equipment manufacturer (OEM) assembly plant end of line (EOL) testing. In other words, an indication that the engine is functioning as desired. Such an indication may be stored at the controller, for example, and responsive to the indication, the first baseline flow may be determined as will be described. In this way, the first baseline flow may be obtained on an engine that is known to be non-degraded, such that the first baseline flow may comprise a high confidence measurement of the first baseline flow.

In some examples, the test for obtaining the first baseline flow may be initiated via a technician with the ability to execute methods via the controller. In other words, after an engine has passed EOM EOL testing, a technician may ensure that the first baseline flow measurements are obtained.

Conditions being met at 402 may additionally or alternatively include an indication that the engine is deactivated, and not combusting air and fuel. Conditions being met at 402 may additionally or alternatively include an indication that the electric booster (e.g. 155) is functioning as desired.

It may be understood that while the first baseline flow measurements may be obtained on a new engine that has passed OEM EOL testing, there may be other opportunities to obtain baseline measurements during subsequent drive cycles, such as after the vehicle has been sold to a customer and driven repeatedly. In other words, the baseline measurements may be updated periodically, provided conditions are met for obtaining such measurements. For example, such opportunities may include situations where there is no indication that the wastegate, electric booster, or engine is degraded. For example, if there is an indication of one or more of low or inaccurate boost, poor fuel economy, black smoke, engine overheating, turbo overspeed, etc., then it may be understood that conditions may not be met for obtaining first baseline flow measurements.

If there is not an indication of degradation of the wastegate, electric booster, engine, etc., and a predetermined duration of time has elapsed and/or a predetermined number of miles have elapsed since a prior first baseline flow measurement, then conditions may be indicated to be met for conducting the first baseline flow diagnostic.

In some examples, responsive to the predetermined duration of time elapsing and/or the predetermined number of miles being driven since a prior first baseline flow measurement, the first baseline flow measurement procedure may be scheduled. For example, if the vehicle is being driven when the predetermined duration and/or predetermined number of miles elapses, then the first baseline flow measurement procedure may be scheduled for the next engine-off, vehicle-off event, provided there is no indication of degradation of one or more of the engine, wastegate, and/or electric booster. In one example, the first baseline flow measurement procedure may be scheduled such that a wakeup of the controller may occur at a predetermined time (e.g. 6 hours) after the next key-off event, in order to conduct the procedure. In other examples, conditions being met at 402 may include an indication of a remote start event, where it is further indicated that the vehicle is not occupied. In such an example, the first baseline flow measurement may be obtained quickly, just prior to activating the engine to combust air and fuel, for example.

As discussed above, the procedure for obtaining baseline measurements, and test measurements may include activating the electric booster (e.g. 155). The electric booster may utilize power stored in the onboard energy storage device (e.g. 250), such as a battery. Thus, in some examples conditions being met may include an indication of a battery state of charge (SOC) above a threshold SOC. For example, the threshold SOC may comprise an SOC where downstream applications such as starting the engine in response to a request to start the engine, driving in electric-only mode or hybrid mode, providing cabin heating and/or air conditioning, etc., may not be adversely affected. In some examples where the vehicle comprises a plug-in hybrid electric vehicle (PHEV), then conditions being met may include an indication that the vehicle is plugged in to the electrical grid, such that any power used to activate the electric booster may be drawn from the grid, rather than the onboard energy storage device.

If, at 402, it is indicated that conditions are not met for conducting the procedure to obtain the first baseline flow measurement, method 400 may proceed to 406. At 406, method 400 may include maintaining current vehicle operating conditions. For example, if the vehicle is in operation with the engine combusting air and fuel, then such conditions may be maintained. In another example, if the vehicle is in operation, being propelled via an electric-only mode of operation, such conditions may be maintained. In still other examples where the vehicle is off, and where conditions are not indicated to be met for conducting the procedure, the vehicle may be maintained off. Method 400 may then end.

Returning to 402, responsive to conditions being indicated to be met for conducting the first baseline flow measurements, method 400 may proceed to 408. At 408, method 400 may include controlling the engine to park at a predetermined position (e.g. predetermined angle). For example, the engine may be controlled such that a predetermined piston coupled to a predetermined cylinder (e.g. 30) is parked at top dead center (TDC), where TDC may refer to a position of the piston farthest from the crankshaft (e.g. 174). In some examples, the engine may be controlled such that the predetermined piston coupled to the predetermined cylinder is parked within a threshold number of degrees (e.g. within 5° or less of TDC). It may be understood that bottom dead center (BDC) of the piston may comprise a position of the piston closest to the crankshaft. Thus, TDC may be 180° from BDC. By defining BDC in relation to TDC as such, the predetermined number of degrees from BDC may readily be determined via the controller (e.g. 12) based on one or more of a camshaft position and/or crankshaft position. To control the engine to the predetermined position, the engine may be rotated unfueled via the electric machine (e.g. 52), for example. More specifically, the controller may send a signal to the electric machine, commanding it to rotate the engine until it is indicated that the predetermined piston has been controlled to the predetermined position. Such an indication may be provided via one or more of camshaft sensor(s) (e.g. 199) and/or crankshaft sensor (e.g. 174). As discussed above at FIG. 2, controlling the predetermined piston to the predetermined position may result in an intake valve and an exhaust valve of the cylinder being at least partially open, such that air may flow from the intake manifold (e.g. 22) to exhaust manifold (e.g. 36) through the engine, as will be discussed in further detail below.

It may be understood that any one of the cylinders of the engine may be selected as the predetermined cylinder, for positioning the predetermined piston at the predetermined position. However, it may be understood that it may be beneficial to always park the same predetermined piston of the same predetermined cylinder at the predetermined position, in order to minimize variation between cylinders for conducting the baseline measurement procedures. However, in other examples it may be understood that any one of the engine cylinders may be parked at the predetermined position.

With the engine parked at the predetermined position, method 400 may proceed to 412. At 412, method 400 may include commanding closed the wastegate (e.g. 91), and may further include commanding closed the EGR valve (e.g. 152). With the wastegate and EGR valve closed, method 400 may proceed to 416. At 416, method 400 may include activating the electric booster (e.g. 155). For example, the electric booster may be activated at a predetermined speed and/or power level. In another example, the electric booster may be activated, and air flow may be monitored in the intake manifold via, for example, via the MAF sensor (e.g. 121), such that the electric booster may be controlled to maintain a predetermined mass air flow rate.

With the electric booster activated at 416, method 400 may proceed to 420. At 420, method 400 may include monitoring the air flow in the exhaust system, for a first predetermined duration. Air flow may be monitored via, for example, a pressure sensor (e.g. 165) positioned in the exhaust system (e.g. 163), downstream of the turbine (e.g. 116) and wastegate (e.g. 91). Measurements of the air flow may be recorded continuously, or periodically, over the course of the first predetermined duration. For example, measurements may be taken every 1 sec or less, every 2 seconds, every 3 seconds, every 4 seconds, every 5 seconds, every 10 seconds, etc. The first predetermined duration may in some examples be a function of SOC of the onboard energy storage device. Specifically, the first predetermined duration may be decreased as SOC decreases, and may be increased as SOC increases. However, in other examples the first predetermined duration may comprised a fixed duration that is not a function of SOC.

Subsequent to the first predetermined duration elapsing, the measurements of the air flow may be averaged together, to obtain the first flow. The first flow may then be stored at the controller.

With the first flow recorded at the controller, method 400 may proceed to 424. At 424, method 400 may include commanding open the EGR valve. It may be understood that the EGR valve may be commanded via the controller to a fully open position. In other words, the controller may send a signal to the EGR valve, actuating it fully open.

With the EGR valve commanded open at 424, method 400 may proceed to 428. At 428, method 400 may include recording air flow in the exhaust system for a second predetermined duration. The air flow may similarly be monitored via the pressure sensor (e.g. 165) positioned in the exhaust system, and measurements of the air flow may be recorded continuously, or periodically, over the course of the second predetermined duration. For example, measurements may be taken every 1 sec or less, every 2 seconds, every 3 seconds, every 4 seconds, every 5 seconds, every 10 seconds, etc. It may be understood that the second predetermined duration may comprise the same duration as the first predetermined duration. However, in other examples, the second predetermined duration may comprise a different predetermined duration than the first predetermined duration. Similarly to that discussed above, the second predetermined duration may in some examples be a function of SOC of the onboard energy storage device. Subsequent to the second predetermined duration elapsing, the measurements of the air flow obtained with the EGR valve open may be averaged together, to obtain the second flow. The second flow may then be stored at the controller.

With the first flow and the second flow recorded and stored at the controller, method 400 may proceed to 432. At 432, method 400 may include deactivating the electric booster to stop air flow, and may further include commanding closed the EGR valve. While not explicitly illustrated, in some examples at 432 the engine may be returned to its default position, or the position that the engine was in prior to being controlled to the predetermined position (e.g. within predetermined number of degrees from TDC).

Proceeding to 436, method 400 may include obtaining the difference (for example, the absolute value of the difference) between the first flow and the second flow. For example, the first flow may be subtracted from the second flow, to obtain the first baseline flow ($BL1_{closedWG}$ flow). The first baseline flow may then be stored at the controller at 440. While not explicitly illustrated, it may be understood that in the event that the method 400 was conducted via a wakeup of the controller, the controller may be returned to sleep subsequent to storing the results of the method at the controller. Method 400 may then end.

While method 400 depicted an example methodology for obtaining the first baseline flow under conditions of a closed wastegate, method 500 depicted at FIG. 5 illustrates example methodology for obtaining the second baseline flow ($BL2_{openWG}$ flow) under conditions of an open wastegate. Accordingly, turning to FIG. 5, a high-level example method 500 for obtaining the second baseline flow measurements, is shown. Method 500 will be described in reference to the systems described in FIGS. 1-2, though it should be understood that method 500 may be applied to other systems without departing from the scope of this disclosure. Method 500 may be carried out by a controller, such as controller 12, and may be stored as executable instructions in non-transitory memory. Instructions for carrying out method 500 and the rest of the methods included herein may be executed by the controller based on instructions stored on a memory of the controller and in conjunction with signals received from sensors of the vehicle system, such as the sensors described above with reference to FIGS. 1-2. The controller may employ engine system actuators such as motor (e.g. 52), EGR valve (e.g. 152), electric booster (e.g. 155), wastegate (e.g. 91), etc., according to the methods depicted below.

It may be understood that the methodology for obtaining the second baseline flow is essentially the same as the methodology for obtaining the first baseline flow as described in detail at FIG. 4. Thus, the methodology of FIG. 5 will only be described briefly, for brevity. Specifically, aside from the wastegate being commanded closed according to the method of FIG. 4, the wastegate is instead commanded open. However, the rest of the method 500 may proceed similar to that of method 400.

Method 500 begins at 502, and may include indicating whether conditions are met for obtaining the second baseline flow. If conditions are not met (see step 402 for details of conditions being met), method 500 may proceed to 506, where current vehicle operating conditions may be maintained. Method 500 may then end.

Returning to 502, responsive to conditions being met for obtaining the second baseline flow, method 500 may proceed to 508. At 508, method 500 may include parking the engine at the predetermined position. It may be understood that the same piston coupled to the same cylinder as that described at FIG. 4 may be parked at the predetermined position (e.g. within the threshold number of degrees from TDC). Responsive to the engine being parked at the predetermined angle at 508, method 500 may proceed to 512, and may include commanding open the wastegate to a fully open position, and commanding closed the EGR valve. With the wastegate open and the EGR valve closed, method 500 ma proceed to 516 and may include activating the electric booster. The electric booster may be activated as described at step 416 of method 400.

With the electric booster activated at 516, and with the EGR valve closed and the wastegate open, it may be understood that air flow from the electric booster may be routed through the engine, and around the turbine via the wastegate passage.

Proceeding to 520, method 500 may include monitoring the air flow in the exhaust system, for a third predetermined duration. It may be understood that the third predetermined duration may comprise the same duration as the first and/or second predetermined duration(s) described in detail at FIG. 4, or may comprise a different duration. Subsequent to the third predetermined duration elapsing, the measurements of the air flow may be averaged together, to obtain the third flow. The third flow may then be stored at the controller.

With the third flow stored at the controller, method 500 may proceed to 524. At 524, method 500 may include commanding open the EGR valve. It may be understood that the EGR valve may be commanded fully open at 524. With the EGR valve commanded open, method 500 may proceed to 528, and may include recording a fourth flow for a fourth predetermined duration. It may be understood that the fourth predetermined duration may comprise the same duration as the first, second and/or third predetermined duration(s), or may comprise a different duration. Subsequent to the fourth predetermined duration elapsing, the measurements of the air flow obtained with the EGR valve open (and wastegate open) may be averaged together, to obtain the fourth flow. The fourth flow may then be stored at the controller.

With the third flow and the fourth flow recorded and stored at the controller, method 500 may proceed to 532. At 532, method 500 may include deactivating the electric booster to stop air flow, and may further include commanding closed the EGR valve and commanding closed the wastegate. While not explicitly illustrated, in some examples at 532 the engine may be returned to its default position, or the position that the engine was in prior to being controlled to the predetermined position (e.g. within predetermined number of degrees from TDC).

Proceeding to 536, method 500 may include obtaining the difference (for example, the absolute value of the difference) between the third flow and the fourth flow. For example, the third flow may be subtracted from the fourth flow, to obtain the second baseline flow ($BL2_{openWG}$ flow). The second baseline flow may then be stored at the controller at 540. While not explicitly illustrated, it may be understood that in the event that the method 500 was conducted via a wakeup of the controller, the controller may be returned to sleep subsequent to storing the results of the method at the controller. Method 500 may then end.

While not explicitly illustrated, in some examples method 400 may be conducted and then method 500 may be conducted, such that both the first baseline flow and the second baseline flow may be obtained in the same engine-off time period. However, in other examples, the first baseline flow may be obtained at one engine-off time point, and the second baseline flow may be obtained at another engine-off time point where conditions are met for doing so. In such examples where both baseline flow measurements are not obtained during the same engine-off time period, it may be understood that there may be a threshold time range where both the first baseline flow and the second baseline flow measurements may be obtained, or else new measurements may be requested. For example, if the first baseline flow is obtained, the second baseline flow may be requested to be obtained within a threshold time range of the first baseline flow. The threshold time range may comprise 1 day, 2 days, 3 days, etc.

Returning to FIG. 3, with the first baseline flow determined as described in relation to FIG. 4, and the second baseline flow determined as described in relation to FIG. 5, method 300 may proceed to 306 where the vehicle system may be monitored for symptomology of a wastegate that is not functioning as desired. If such symptoms are identified, then at 308 method 300 may include conducting wastegate diagnostic procedures. Accordingly, method 300 may proceed to FIG. 6.

Turning now to FIG. 6 a high-level example method 600 for conducting a wastegate diagnostic procedure, is shown. More specifically, method 600 may comprise a sub-method of method 300, and may include determining whether the wastegate is stuck open or closed. Method 600 will be described in reference to the systems described in FIGS. 1-2, though it should be understood that method 600 may be applied to other systems without departing from the scope of this disclosure. Method 600 may be carried out by a controller, such as controller 12, and may be stored as executable instructions in non-transitory memory. Instructions for carrying out method 600 and the rest of the methods included herein may be executed by the controller based on instructions stored on a memory of the controller and in conjunction with signals received from sensors of the vehicle system, such as the sensors described above with reference to FIGS. 1-2. The controller may employ engine system actuators such as motor (e.g. 52), EGR valve (e.g.

152), electric booster (e.g. 155), wastegate (e.g. 91), etc., according to the methods depicted below.

Method 600 begins at 602, and may include indicating if vehicle symptoms are indicative of a stuck open wastegate, or a stuck closed wastegate. Specifically, symptoms of a stuck open wastegate may include low boost, poor fuel economy, and/or black smoke emitted from the exhaust system of the vehicle. Alternatively, symptoms of a stuck closed wastegate may include inaccurate boost, engine overheating, and/or turbo overspeed. If, at 602, it is indicated that the vehicle symptoms are not indicative of a stuck open wastegate, but rather a stuck closed wastegate, method 600 may proceed to 605. At 605, method 600 may include indicating whether conditions are met for diagnosing a stuck closed wastegate. Conditions being met for conducting the stuck closed wastegate procedure may include an engine-off condition, and an indication that the vehicle is unoccupied. In some examples a wakeup of the controller may be scheduled to conduct the diagnostic, where conditions being met may include an indication that the vehicle is not occupied. Other examples of conditions being met for conducting the wastegate diagnostic may include a remote start event where the vehicle is indicated to be unoccupied. For example, in response to a remote start request, the stuck closed wastegate procedure may be conducted prior to activating the engine to combust air and fuel, if the remote start event calls for such action.

If, at 605, conditions are not indicated to be met for conducting the stuck closed wastegate diagnostic, method 600 may proceed to 606. At 606, method 600 may include maintaining current vehicle operating conditions, until it is indicated that conditions are met for conducting the stuck closed wastegate diagnostic procedure.

Responsive to conditions being met for conducting the stuck closed wastegate diagnostic, method 600 may proceed to 608. It may be understood that the rest of the methodology (steps 608-636) for conducting the stuck closed wastegate diagnostic procedure is essentially the same as that for obtaining the second baseline flow, as discussed above at FIG. 5. Thus, for brevity, the steps 608-636 of method 600 will be briefly described.

At 608, method 600 may include parking the engine at the predetermined position, specifically with the predetermined piston of the predetermined cylinder parked within the threshold number of degrees from TDC. As discussed, the electric machine (e.g. 52) may be commanded via the controller to rotate the engine until the predetermined piston is at the predetermined position. With the engine parked at the predetermined position, method 600 may proceed to 612, and may include commanding closed the EGR valve, and commanding open the wastegate. With the wastegate commanded to a fully open position, and the EGR valve commanded closed, method 600 may proceed to 616, and may include activating the electric booster. As discussed above, the electric booster may be activated at the predetermined speed and/or power level, or may be activated and controlled so as to maintain a predetermined mass air flow rate as monitored via, for example, the MAF sensor.

With the electric booster activated at 616, method 600 may proceed to 620. At 620, method 600 may include recording air flow via the pressure sensor (e.g. 165) positioned in the exhaust system. More specifically, air flow may be monitored for a fifth predetermined duration. It may be understood that the fifth predetermined duration may comprise the same duration as the first, second, third and/or fourth predetermined duration(s) as described above with regard to FIGS. 4-5, or may comprise a different duration. Subsequent to the fifth predetermined duration elapsing, the measurements of air flow may be averaged together, to obtain the fifth flow. The fifth flow may be stored at the controller.

With the fifth flow stored at the controller, method 600 may proceed to 624. At 624, method 600 may include commanding open the EGR valve. It may be understood that the EGR valve may be commanded fully open at 624. With the EGR valve commanded open, method 600 may proceed to 628, and may include recording air flow for a sixth predetermined duration. It may be understood that the sixth predetermined duration may comprise the same duration as the first, second, third, fourth, and/or fifth predetermined duration(s), or may comprise a different duration. Subsequent to the fifth predetermined duration elapsing, the measurements of the air flow obtained with the EGR valve open (and wastegate commanded open) may be averaged together, to obtain the sixth flow. The sixth flow may then be stored at the controller.

Proceeding to 632, method 600 may include deactivating the electric booster to stop air flow, and may further include commanding closed the EGR valve and commanding closed the wastegate. While not explicitly illustrated, in some examples at 632 the engine may be returned to its default position, or the position that the engine was in prior to being controlled to the predetermined position (e.g. within predetermined number of degrees from TDC).

Proceeding to 636, method 600 may include obtaining the difference (for example, the absolute value of the difference) between the fifth flow and the sixth flow. For example, the fifth flow may be subtracted from the sixth flow, to obtain the first test measurement flow (TM1 flow). The first test measurement flow may then be stored at the controller.

With TM1 flow obtained, method 600 may proceed to 640, and may include the controller comparing the second baseline flow ($BL2_{openWG}$ flow) to the first test measurement flow (TM1 flow). If, at 640, the TM1 flow is substantially equivalent (e.g. within 5%) to the $BL2_{openWG}$ flow, then it may be indicated that the wastegate is not stuck closed. In other words, because the wastegate was commanded open, and because the TM1 flow was substantially equivalent to the second baseline flow ($BL2_{openWG}$ flow), then it may indicated that the wastegate is functioning as desired. Alternatively, if the wastegate was not able to be opened, even though it was commanded open, then the TM1 flow may be substantially equivalent (e.g. within 5%) to the first baseline flow ($BL1_{closedWG}$ flow). In other words, because the wastegate was commanded open, and because the TM1 flow was substantially equivalent to the first baseline flow, then it may be indicated the wastegate is stuck closed.

Still further, there may in some examples be opportunity to indicate a wastegate that is not stuck fully open or fully closed, but rather, somewhere in between. For example, if the TM1 is not substantially equivalent to either the first baseline flow or the second baseline flow, but rather is somewhere in between, then it may be indicated that the wastegate is not functioning as desired, but it not stuck fully open or stuck fully closed.

Subsequent to assessing the operational status of the wastegate a determination of whether the wastegate is indicated to be functioning as desired, or is either stuck closed or not functioning as desired (e.g. unable to fully open), may be stored at the controller. Proceeding to 644, method 600 may return to step 324 of method 300. Method 600 may then end.

Returning now to step 324 of method 300, responsive to the stuck closed wastegate diagnostic being conducted, method 300 may proceed to 328. At 328, method 300 may include updating vehicle operating parameters as a function of the results of the stuck closed wastegate diagnostic conducted according to FIG. 6. For example, if the wastegate is indicated to be functioning as desired, then it may be indicated that the symptoms which were indicative of a stuck closed wastegate may be due to some other issues related to the engine system. Accordingly, at 328, method 300 may include scheduling follow-up tests in an attempt to determine the root cause of the indicated symptoms. In such an example, a malfunction indicator light (MIL) may be illuminated at the vehicle dash, alerting the vehicle operator of a request to service the vehicle. In a case where the wastegate is indicated to be stuck closed, then at 328, updating vehicle operating parameters may include scheduling the vehicle to operate as frequently as possible in an electric mode of operation, so as to prevent undesirable circumstances related to engine operation with a stuck closed wastegate. Furthermore, a MIL may be illuminated at the vehicle dash, to alert the vehicle operator of a request to have the vehicle serviced. In a case where the wastegate is not functioning as desired, but is not stuck fully closed, updating vehicle operating parameters may include illuminating a MIL at the dash, and may further include operating the vehicle as frequently as possible in the electric-only mode. Method 300 may then end.

Returning now to FIG. 6, responsive to vehicle symptoms being indicative of a stuck open wastegate at 602, for example, low boost conditions, poor fuel economy and/or black smoke being emitted from the exhaust system, method 600 may proceed to 604. At 604, method 600 may include conducting a stuck open wastegate diagnostic according to the method of FIG. 7.

Accordingly, turning now to FIG. 7, a high-level example method 700 for conducting a stuck open wastegate diagnostic procedure, is shown. Specifically, method 700 may comprise a sub-method of method 300, and may further comprise a sub-method of method 600. Method 700 will be described in reference to the systems described in FIGS. 1-2, though it should be understood that method 700 may be applied to other systems without departing from the scope of this disclosure. Method 700 may be carried out by a controller, such as controller 12, and may be stored as executable instructions in non-transitory memory. Instructions for carrying out method 700 and the rest of the methods included herein may be executed by the controller based on instructions stored on a memory of the controller and in conjunction with signals received from sensors of the vehicle system, such as the sensors described above with reference to FIGS. 1-2. The controller may employ engine system actuators such as motor (e.g. 52), EGR valve (e.g. 152), electric booster (e.g. 155), wastegate (e.g. 91), etc., according to the methods depicted below.

Method 700 begins at 705, and may include indicating whether conditions are met for diagnosing a stuck open wastegate. Conditions being met for conducting the stuck open wastegate procedure may include an engine-off condition, and an indication that the vehicle is unoccupied. In some examples a wakeup of the controller may be scheduled to conduct the diagnostic, where conditions being met may include an indication that the vehicle is not occupied. Other examples of conditions being met for conducting the wastegate diagnostic may include a remote start event where the vehicle is indicated to be unoccupied. For example, in response to a remote start request, the stuck open wastegate procedure may be conducted prior to activating the engine to combust air and fuel, if the remote start event calls for such action.

If, at 705, conditions are not indicated to be met for conducting the stuck closed wastegate diagnostic, method 700 may proceed to 706. At 706, method 700 may include maintaining current vehicle operating conditions, until it is indicated that conditions are met for conducting the stuck open wastegate diagnostic procedure.

Responsive to conditions being met for conducting the stuck open wastegate diagnostic, method 700 may proceed to 708. It may be understood that the rest of the methodology (steps 708-736) for conducting the stuck closed wastegate diagnostic procedure is essentially the same as that for obtaining the first baseline flow, as discussed above at FIG. 4. Thus, for brevity, the remaining steps of method 700 will be briefly described.

At 708, method 700 may include parking the engine at the predetermined position, specifically with the predetermined piston of the predetermined cylinder parked within the threshold number of degrees from TDC. As discussed, the electric machine (e.g. 52) may be commanded via the controller to rotate the engine until the predetermined piston is at the predetermined position. With the engine parked at the predetermined position, method 700 may proceed to 712, and may include commanding closed the EGR valve, and commanding closed the wastegate. With the wastegate commanded to a fully closed position, and the EGR valve commanded closed, method 700 may proceed to 716, and may include activating the electric booster. As discussed above, the electric booster may be activated at the predetermined speed and/or power level, or may be activated and controlled so as to maintain a predetermined mass air flow rate as monitored via, for example, the MAF sensor.

With the electric booster activated at 716, method 700 may proceed to 720. At 720, method 700 may include recording air flow via the pressure sensor (e.g. 165) positioned in the exhaust system. More specifically, air flow may be monitored for a seventh predetermined duration. It may be understood that the seventh predetermined duration may comprise the same duration as the first, second, third, fourth, fifth and/or sixth predetermined duration(s) as described above with regard to FIGS. 4-6, or may comprise a different duration. Subsequent to the seventh predetermined duration elapsing, the measurements of air flow may be averaged together, to obtain the seventh flow. The seventh flow may be stored at the controller.

With the seventh flow stored at the controller, method 700 may proceed to 724. At 724, method 700 may include commanding open the EGR valve. It may be understood that the EGR valve may be commanded fully open at 724. With the EGR valve commanded open, method 700 may proceed to 728, and may include recording air flow for an eighth predetermined duration. It may be understood that the eighth predetermined duration may comprise the same duration as the first, second, third, fourth, fifth, sixth and/or seventh predetermined duration(s), or may comprise a different duration. Subsequent to the eighth predetermined duration elapsing, the measurements of the air flow obtained with the EGR valve open (and wastegate commanded closed) may be averaged together, to obtain the eighth flow. The eighth flow may then be stored at the controller.

Proceeding to 732, method 700 may include deactivating the electric booster to stop air flow, and may further include commanding closed the EGR valve and commanding closed the wastegate. While not explicitly illustrated, in some examples at 732 the engine may be returned to its default position, or the position that the engine was in prior to being controlled to the predetermined position (e.g. within predetermined number of degrees from TDC).

Proceeding to 736, method 700 may include obtaining the difference (for example, the absolute value of the difference) between the seventh flow and the eighth flow. For example, the seventh flow may be subtracted from the eighth flow, to obtain the second test measurement flow (TM2 flow). The second test measurement flow may then be stored at the controller.

With TM2 flow obtained, method 700 may proceed to 740, and may include the controller comparing the first baseline flow ($BL1_{closedWG}$ flow) to the second test measurement flow (TM2 flow). If, at 740, the TM2 flow is substantially equivalent (e.g. within 5%) to the $BL1_{closedWG}$ flow, then it may be indicated that the wastegate is not stuck open. In other words, because the wastegate was commanded closed, and because the TM2 flow was substantially equivalent to the first baseline flow $BL1_{closedWG}$ flow), then it may indicated that the wastegate is functioning as desired. Alternatively, if the wastegate was not able to be closed, even though it was commanded closed, then the TM2 flow may be substantially equivalent (e.g. within 5%) to the second baseline flow ($BL2_{openWG}$ flow). In other words, because the wastegate was commanded closed, and because the TM2 flow was substantially equivalent to the second baseline flow, then it may be indicated the wastegate is stuck open.

As discussed above, there may in some examples be opportunity to indicate a wastegate that is not stuck fully open or fully closed, but rather, somewhere in between. For example, if the TM2 is not substantially equivalent to either the first baseline flow or the second baseline flow, but rather is somewhere in between, then it may be indicated that the wastegate is not functioning as desired, but it not stuck fully open or stuck fully closed.

Subsequent to assessing the operational status of the wastegate a determination of whether the wastegate is indicated to be functioning as desired, or is either stuck closed or not functioning as desired (e.g. unable to fully open), may be stored at the controller. Proceeding to 744, method 700 may return to step 604 of method 600. Method 700 may then end.

Returning now to step 604 of method 600, responsive to the stuck open wastegate diagnostic having been conducted, method 600 may proceed to 644, where method 600 may include returning to step 324 of method 300. At 324 of method 300, responsive to the stuck open wastegate diagnostic being conducted, method 300 may proceed to 328. At 328, method 300 may include updating vehicle operating parameters as a function of the results of the stuck open wastegate diagnostic conducted according to FIG. 7. For example, if the wastegate is indicated to be functioning as desired, then it may be indicated that the symptoms which were indicative of a stuck open wastegate may be due to some other issues related to the engine system. Accordingly, at 328, method 300 may include scheduling follow-up tests in an attempt to determine the root cause of the indicated symptoms. In such an example, a malfunction indicator light (MIL) may be illuminated at the vehicle dash, alerting the vehicle operator of a request to service the vehicle. In a case where the wastegate is indicated to be stuck open, then at 328, updating vehicle operating parameters may include operating the vehicle in the electric-only mode as frequently as possible. Furthermore, a MIL may be illuminated at the vehicle dash, to alert the vehicle operator of a request to have the vehicle serviced. In a case where the wastegate is not functioning as desired, but not stuck fully open, updating vehicle operating parameters may include illuminating a MIL at the dash, and may further include operating the vehicle as frequently as possible in the electric-only mode. Method 300 may then end.

Turning now to FIGS. 8A-8B, they illustrate example timelines 800 and 850, respectively, for obtaining the first baseline flow ($BL1_{closedWG}$ flow) and the second baseline flow ($BL2_{openWG}$ flow), respectively. FIG. 8A includes plot 805, indicating whether the eBooster is on, or off, over time. Timeline 800 further includes plot 810, indicating whether the wastegate is commanded to an open, or closed position, and plot 815, indicating whether the EGR valve is open, or closed, over time. Timeline 800 further includes plot 820, indicating air flow in the exhaust system, over time. Line 821 represents the first flow, and line 822 represents the second flow.

At time t0, the electric booster is off (plot 805), the wastegate is closed (plot 810), the EGR valve is closed (plot 815), and there is no air flow in the exhaust system (plot 820). While not explicitly shown, between time t0 and t1, it may be understood that conditions have become met for conducting the first baseline flow ($BL1_{closedWG}$ flow) measurement. Accordingly, while not explicitly illustrated, between time t0 and t1, it may be understood that the engine is controlled such that the predetermined piston coupled to the predetermined cylinder is controlled to the predetermined position (e.g. within the predetermined number of degrees from TDC). Furthermore, between time t0 and t1 the controller commands or maintains closed the wastegate (plot 810) and the EGR valve (plot 815). With the wastegate and EGR valve commanded closed, the electric booster is activated at time t1. While not explicitly illustrated, in some examples the electric booster may be activated to a predetermined speed or power level, or in other examples may be controlled such that a predetermined air flow as monitored via a MAF sensor positioned in the intake manifold, for example, is achieved. With the electric booster commanded on at time t1, and with the wastegate and EGR valve closed, it may be understood that air flow from the electric booster is routed through the engine, and turbine (e.g. 116). Such air flow is monitored via the pressure sensor (e.g. 165) positioned downstream of the turbine. Accordingly, air flow in the exhaust system (plot 820) increases and then stabilizes between time t1 and t2. The air flow with the EGR valve and wastegate commanded closed comprises the first flow, represented by line 821. The first flow is stored at the controller, as discussed above.

At time t2, the EGR valve is commanded open (plot 815), while the electric booster is maintained on (plot 805) and where the wastegate is maintained closed. With the EGR valve commanded open, air flow is routed primarily around the engine via the EGR passage, and through the turbine. In other words, the air flow bypasses the engine, but is still routed through the turbine. Thus, air flow increases between time t2 and t3, and stabilizes. The air flow with the EGR valve open and the wastegate closed comprises the second flow, represented by line 822. As discussed, the second flow is stored at the controller.

With the predetermined piston controlled to the predetermined position between time t0 and t1, at time t1 the electric booster is commanded on (plot 805). At time t3, with the first and second flow stored at the controller, the EGR valve is commanded closed, and accordingly, between time t3 and t4 the air flow in the exhaust system returns to the first flow. At time t4, the electric booster is deactivated. While not explicitly illustrated, in some examples the engine may be controlled to the position it was in prior to conducting the diagnostic.

Between time t4 and t5, the controller subtracts the first flow from the second flow, represented via arrow 823, to obtain the first baseline flow ($BL1_{closedWG}$ flow). In this way, the first baseline flow may be obtained under conditions where it is known that the engine, electric booster, wastegate, etc., are functioning as desired.

Turning now to FIG. 8B, example timeline 850 illustrates how the second baseline flow ($BL2_{openWG}$ flow) is obtained. Timeline 850 includes plot 855, indicating whether the electric booster is on, or off, over time. Timeline 850 further includes plot 860, indicating whether the wastegate is commanded open or closed, and plot 865, indicating whether the EGR valve is commanded open or closed, over time. Timeline 850 further includes plot 870, indicating air flow in the exhaust system, over time. Line 871 represents the third flow, and line 872 represents the fourth flow.

At time t0, the electric booster is off (plot 855), the wastegate (plot 860) and the EGR valve (plot 865) are closed, and there is no flow (plot 870) in the exhaust system. Between time t0 and t1, while not explicitly illustrated, it may be understood that conditions are indicated to be met for obtaining the second baseline flow. With conditions being indicated to be met between time t0 and t1, while not explicitly shown it may be understood that the engine is controlled such that the predetermined piston coupled to the predetermined cylinder is controlled to the predetermined position (e.g. within the predetermined number of degrees from TDC).

With the engine controlled to the predetermined position between time t0 and t1, at time t1 the wastegate is commanded open (plot 860), and the EGR valve is commanded or maintained closed (plot 865). At time t2, the electric booster is activated. As discussed, in some examples the electric booster may be controlled to a predetermined speed or power level, or in other examples may be controlled to achieve a predetermined air flow as monitored via a MAF sensor positioned in the intake manifold.

With the electric booster activated at time t2, and with the wastegate open and the EGR valve closed, it may be understood that air flow is routed through the engine, and around the turbine via the wastegate passage. Such air flow is monitored via the pressure sensor (e.g. 165) positioned downstream of the turbine, as discussed. Accordingly, between time t2 and t3, air flow in the exhaust system increases and stabilizes. Because the air flow is routed around the turbine, air flow is greater than when the wastegate is closed (compare air flow between time t1 and t2 at FIG. 8A to air flow between time t1 and t2 at FIG. 8B). The air flow recorded between time t2 and t3 comprises the third flow, represented by line 871. As discussed, once obtained, the third flow is stored at the controller.

With the third flow obtained at time t3, the EGR valve is commanded open (plot 865). With the EGR valve commanded open, and with the waste gate commanded open, air flow may be routed primarily around the engine, and around the turbine. Accordingly, between time t3 and t4, air flow increases to the fourth flow, represented by line 872. The fourth flow is recorded at the controller.

With the fourth flow obtained by time t4, at time t4 the EGR valve is commanded closed (plot 865). With the EGR valve commanded closed, air flow in the exhaust system returns to the third flow between time t4 and t5. At time t5, the electric booster is commanded off, and accordingly, air flow in the exhaust returns to a condition of no flow between time t5 and t6. At time t6, the wastegate is commanded closed. While not explicitly illustrated, the engine may in some examples be controlled to the position it was in prior to conducting the diagnostic.

Between time t6 and t7, the controller subtracts the third flow from the fourth flow (represented via arrow 873), to obtain the second baseline flow ($BL2_{openWG}$ flow). In this way, the second baseline flow may be obtained under conditions where it is known that the engine, electric booster, wastegate, etc., are functioning as desired.

Turning now to FIGS. 9A-9B, they represent example timelines 900 and 950, respectively, for obtaining the first test measurement (TM1 flow) and the second test measurement (TM2 flow), respectively. More specifically, FIG. 9A represents a situation where symptoms indicate a potentially stuck closed wastegate (see FIG. 6), whereas FIG. 9B represents a situation where symptoms indicated a potentially stuck open wastegate (see FIG. 7). Accordingly, at FIG. 9A, the first test measurement is obtained to diagnose whether the wastegate is stuck closed, and at FIG. 9B, the second test measurement is obtained to diagnose whether the wastegate is stuck open.

FIG. 9A includes plot 905, indicating the status of the electric booster (on or off), over time. Timeline 900 further includes plot 910, indicating whether the wastegate is commanded open or closed, and plot 915, indicating whether the EGR valve is commanded open or closed, over time. Timeline 900 further includes plot 920, indicating air flow in the exhaust system, as monitored via the pressure sensor (e.g. 165) positioned downstream of the turbine (e.g. 116), over time. Timeline 900 further includes plot 925, indicating whether the wastegate is stuck closed, over time.

At time t0, the electric booster is off (plot 905), the wastegate is commanded closed (plot 910), and the EGR valve is commanded closed (plot 915). There is no flow in the exhaust system (plot 920), and the waste gate is not yet indicated to be stuck closed (plot 925).

Between time t0 and t1, while not explicitly illustrated, it may be understood that conditions have become met for conducting the diagnostic for assessing whether the wastegate is stuck closed. In other words, it may be understood that symptoms as monitored via the controller are such that it is indicated the wastegate may potentially be stuck in a closed configuration. Accordingly, the engine may be controlled to the predetermined position (e.g. where the predetermined piston is controlled to within the predetermined number of degrees from TDC). With conditions being met for conducting the stuck closed wastegate diagnostic, and with the engine controlled to the predetermined position, at time t1 the wastegate is commanded open. With the wastegate commanded open, at time t2 the electric booster is activated. As discussed, in some examples the electric booster may be activated at a predetermined speed or power level, whereas in other examples the electric booster may be controlled to achieve a predetermined air flow in the intake manifold, as monitored via the MAF sensor positioned in the intake manifold, for example.

With the wastegate commanded open, and with the electric booster activated, air flow in the exhaust system increases and stabilizes between time t2 and t3. The air flow between time t2 and t3 thus represents the fifth flow, illustrated by line 921. The fifth flow is recorded at the controller, as discussed.

With the fifth flow obtained, at time t3 the EGR valve is commanded open (plot 915). Again, air flow in the exhaust system is monitored between time t3 and t4. The air flow increases and stabilizes between time t3 and t4. Such air flow constitutes the sixth flow, and accordingly the sixth flow, represented by line 922, is stored at the controller.

With both the fifth flow and the sixth flow obtained by time t4, the EGR valve is commanded closed at time t4, and thus between time t4 and t5 air flow in the exhaust system returns to the fifth flow.

At time t6, the electric booster is commanded off, and thus between time t5 and t6 air flow in the exhaust returns to no flow. At time t6, the wastegate is commanded closed. Between time t6 and t7, the controller subtracts the fifth flow from the sixth flow, to obtain the first test measurement flow (TM1 flow). Once the TM1 flow is determined, the TM1 flow is compared via the controller, to the baseline flow measurements. In this example timeline, the TM1 flow is determined via the controller to be substantially equivalent (e.g. within 5%) to the $BL1_{closedWG}$ flow. Because the wastegate was commanded open, it may be expected that if the wastegate is functioning as desired, that the TM1 flow would be substantially equivalent to the $BL2_{openWG}$ flow. However, in this example timeline 900, this is not indicated to be the case. Instead, the TM1 flow is substantially equivalent to the $BL1_{closedWG}$ flow. Accordingly, at time t7, the wastegate is indicated to be stuck closed (plot 925).

Turning now to FIG. 9B, as discussed, it illustrates example timeline 950. More specifically, timeline 950 illustrates a situation where symptoms indicate a potentially stuck open wastegate. Thus, FIG. 9B illustrates how the second test measurement is obtained to diagnose whether the wastegate is stuck open.

Timeline 950 includes plot 955, indicating whether the electric booster is on, or off, over time. Timeline 950 further includes plot 960, indicating whether the wastegate is commanded open or closed, and plot 965, indicating whether the EGR valve is open or closed, over time. Timeline 950 further includes plot 970, indicating air flow in the exhaust system, over time. Timeline 950 further includes plot 975, indicating whether the wastegate is stuck open (yes) or not (no), over time.

At time t0, the electric booster is off (plot 955), and the wastegate is commanded closed (plot 960). The EGR valve is commanded closed (plot 965), and there is no air flow in the exhaust system (plot 970). Furthermore, the wastegate is not indicated to be stuck open (plot 975).

Between time t0 and t1, while not explicitly illustrated, it may be understood that conditions have become met for conducting a diagnostic for a potentially stuck open wastegate. Accordingly, to conduct such a diagnostic, the wastegate and EGR valve are commanded closed, and the engine is controlled to the predetermined position (e.g. where the predetermined piston is within the predetermined number of degrees from TDC) between time t0 and t1. Note that while not explicitly shown, it may be understood the engine is controlled to the predetermined position between time t0 and t1.

With the engine controlled to the predetermined position and with the wastegate commanded closed, the electric booster is activated at time t1. As discussed, in some examples the electric booster may be controlled to a predetermined speed or power level, whereas in other examples the electric booster may be controlled to achieve a predetermined air flow in the intake manifold, as monitored via a MAF sensor positioned in the intake manifold, for example.

With the wastegate commanded closed, the EGR valve commanded closed, and the electric booster activated, air flow in the exhaust system is monitored via the pressure sensor (e.g. 165) positioned downstream of the turbine (e.g. 116). Accordingly, between time t1 and t2, air flow in the exhaust system increases and stabilizes to the seventh flow, represented by line 971. As discussed, the air flow comprising the seventh flow is stored at the controller.

With the seventh flow determined, the EGR valve is commanded open at time t2. With the EGR valve commanded open, air flow from the electric booster is routed primarily around the engine. Accordingly, air flow between time t2 and t3 increases and then stabilizes. The air flow between time t2 and t3 thus comprises the eighth flow, represented by line 972. The eighth flow is stored at the controller.

At time t3, the EGR valve is commanded closed, thus between time t3 and t4 the air flow in the exhaust system returns to the seventh flow. At time t4, the electric booster is deactivated, and thus between time t4 and t5, air flow in the exhaust system returns to no flow. Furthermore, between time t4 and t5, the controller subtracts the seventh flow from the eighth flow, to obtain the second test measurement flow (TM2 flow). Once the TM2 flow is determined, the TM2 flow is compared via the controller, to the baseline flow measurements. In this example timeline, the TM2 flow is determined via the controller to be substantially equivalent (e.g. within 5%) to the $BL2_{openWG}$ flow. Because the wastegate was commanded closed, it may be expected that if the wastegate is functioning as desired, that the TM2 flow would be substantially equivalent to the $BL1_{closedWG}$ flow. However, in this example timeline 950, this is not indicated to be the case. Instead, the TM2 flow is substantially equivalent to the $BL2_{openWG}$ flow. Accordingly, at time t5, the wastegate is indicated to be stuck open (plot 975).

While the systems and methods described herein relate to an actuatable wastegate, it is recognized that in some examples, a wastegate may comprise a spring loaded wastegate that defaults to a closed position. In such an example, similar methodology may be applied to diagnose a stuck open wastegate. For example, under conditions where it is known that the wastegate is functioning as desired (e.g. at the end of the assembly line), or where there is no indicated symptoms of a degraded wastegate, the following methodology may be used to obtain a baseline flow. Specifically, with the EGR valve commanded closed (and with the engine parked at the predetermined position), the electric booster may be commanded on, and air flow in the exhaust system measured to obtain a ninth flow. Next, the EGR valve may be commanded open and air flow in the exhaust system measured to obtain a tenth flow. Subtracting the ninth flow from the tenth flow may yield a third baseline flow ($BL3_{closedWG}$ flow). The third baseline flow may be stored at the controller.

Subsequently, under conditions where it is indicated that the wastegate may be stuck open, an eleventh flow may be obtained with the electric booster activated, and the EGR valve closed. Next, the EGR valve may be commanded open, and a twelfth flow may be determined. The eleventh flow may be then subtracted from the twelfth flow, to obtain a third test measurement flow (TM3 flow). The TM3 flow may be compared to the third baseline flow ($BL3_{closedWG}$ flow), and if the TM3 flow is within a threshold (e.g. within 5%) of the third baseline flow, it may be indicated that the wastegate is functioning as desired. Alternatively, if the TM3 flow is not within the threshold of the third baseline flow, but is greater, then it may be indicated that the wastegate is stuck open.

To diagnose a stuck closed wastegate, where the wastegate comprises a spring loaded wastegate biased to the closed position, the third baseline flow may be made use of. Under conditions where it is indicated that the wastegate may be stuck closed, the electric booster may be commanded on, with the EGR valve commanded closed and the engine parked in the predetermined position. A thirteenth flow may be obtained, and then the EGR valve may be commanded open to provide a fourteenth flow. Subtracting the thirteenth flow from the fourteenth flow may yield a fourth test measurement flow (TM4 flow). If the TM4 flow is within the threshold of the third baseline flow, then the electric booster may be activated to a higher level where it would be expected that the wastegate may open if it is functioning as desired. If, with the electric booster activated at the higher level, a predetermined period of time elapses without air flow in the exhaust increasing to beyond the threshold of the third baseline flow, then it may be indicated that the wastegate is in a stuck closed configuration.

Furthermore, as discussed herein, the methods and systems may be applicable to autonomous vehicles. Accordingly, turning now to FIG. 10, a block diagram of an example autonomous driving system 1000 that may operate the vehicle system 100, described above at FIG. 1. Herein, the vehicle system 100 will be referred to simply as a "vehicle". The autonomous driving system 1000, as shown, includes a user interface device 1010, a navigation system 1015, at least one autonomous driving sensor 1020, and an autonomous mode controller 1025.

The user interface device 1010 may be configured to present information to vehicle occupants, under conditions wherein a vehicle occupant may be present. However, it may be understood that the vehicle may be operated autonomously in the absence of vehicle occupants, under certain conditions. The presented information may include audible information or visual information. Moreover, the user interface device 1010 may be configured to receive user inputs. Thus, the user interface device 1010 may be located in the passenger compartment (not shown) of the vehicle. In some possible approaches, the user interface device 1010 may include a touch-sensitive display screen.

The navigation system 1015 may be configured to determine a current location of the vehicle using, for example, a Global Positioning System (GPS) receiver configured to triangulate the position of the vehicle relative to satellites or terrestrial based transmitter towers. The navigation system 1015 may be further configured to develop routes from the current location to a selected destination, as well as display a map and present driving directions to the selected destination via, for example, the user interface device 1010.

The autonomous driving sensors 1020 may include any number of devices configured to generate signals that help navigate the vehicle. Examples of autonomous driving sensors 1020 may include a radar sensor, a lidar sensor, a vision sensor (e.g. a camera), vehicle to vehicle infrastructure networks, or the like. The autonomous driving sensors 1020 may enable the vehicle to "see" the roadway and vehicle surroundings, and/or negotiate various obstacles while the vehicle 100 is operating in autonomous mode. The autonomous driving sensors 1020 may be configured to output sensor signals to, for example, the autonomous mode controller 1025.

The autonomous mode controller 1025 may be configured to control one or more subsystems 1030 while the vehicle is operating in the autonomous mode. Examples of subsystems 1030 that may be controlled by the autonomous mode controller 1025 may include a brake subsystem, a suspension subsystem, a steering subsystem, and a powertrain subsystem. The autonomous mode controller 1025 may control any one or more of these subsystems 1030 by outputting signals to control units associated with subsystems 1030. In one example, the brake subsystem may comprise an anti-lock braking subsystem, configured to apply a braking force to one or more of wheels (e.g. 135). Discussed herein, applying the braking force to one or more of the vehicle wheels may be referred to as activating the brakes. To autonomously control the vehicle, the autonomous mode controller 1025 may output appropriate commands to the subsystems 1030. The commands may cause the subsystems to operate in accordance with the driving characteristics associated with the selected driving mode. For example, driving characteristics may include how aggressively the vehicle accelerates and decelerates, how much space the vehicle leaves behind a front vehicle, how frequently the autonomous vehicle changes lanes, etc.

In this way, a wastegate diagnostic may be conducted utilizing a differential pressure sensor (e.g. 165) coupled to a gasoline particulate filter. By making use of the differential pressure sensor, such a diagnostic may be conducted without addition of costly exhaust flow sensors. In other words, an existing differential pressure sensor coupled to the gasoline particulate filter may be repurposed to conduct the diagnostics described herein. Furthermore, by enabling a vehicle system to conduct wastegate diagnostics in response to indications of potential wastegate degradation, issues related to engine system degradation may be reduced or avoided, and customer satisfaction may be improved.

The technical effect is to recognize that an electric booster may be utilized to diagnose the wastegate during conditions where the vehicle is not occupied. A related technical effect is to recognize that accurate baseline flow may be obtained under conditions where the wastegate is open, and where the wastegate is closed, by controlling positions of the wastegate, EGR valve, and engine. By obtaining accurate baselines using the methodology described herein, test diagnostics are enabled for indicating whether the wastegate is stuck open, closed, or is degraded such that it cannot fully open or fully close. A still further technical effect is to recognize that in some examples, the methodology described herein may be particularly useful for vehicles that may be plugged in to an electrical grid, such as PHEVs. By conducting the diagnostics discussed herein while the vehicle is plugged into the grid, use of the electric booster may not undesirably decrease SOC of the onboard energy storage device.

The systems described herein, and with reference to FIGS. 1-2, along with the methods described herein, and with reference to FIGS. 3-7, may enable one or more systems and one or more methods. In one example, a method comprises activating an electric air compressor in an intake of an engine to obtain a first and a second baseline air flow in an exhaust system of the engine; and during a degradation test, diagnosing whether a wastegate in the exhaust system is functioning as desired by activating the electric air compressor and comparing a test air flow in the exhaust system to the first and/or the second baseline air flow. In a first example of the method, the method further comprises just prior to activating the electric air compressor to obtain the first baseline air flow, the second baseline air flow, and just prior to diagnosing whether the wastegate is functioning as desired, controlling the engine via a motor to a predetermined position, where the predetermined position includes a predetermined piston coupled to a predetermined cylinder of the engine within a threshold number of degrees from top dead center. A second example of the method optionally includes the first example, and further includes wherein obtaining the first and the second baseline air flow, and diagnosing whether the wastegate is functioning as desired includes monitoring air flow in the exhaust system of the engine with an exhaust gas recirculation valve positioned in an exhaust gas recirculation passage which is coupled to the exhaust system for a predetermined duration with the exhaust gas recirculation valve closed, then monitoring air flow in the exhaust system of the engine with the exhaust gas recirculation valve open; and obtaining a difference between air flow with the exhaust gas recirculation valve open compared to air flow with the exhaust gas recirculation valve closed to provide the first baseline flow, the second baseline air flow, or the test flow. A third example of the method optionally includes any one or more or each of the first and second examples, and further includes wherein the first baseline air flow, the second baseline air flow, and the test air flow is monitored via a differential pressure sensor positioned in an exhaust system downstream of a turbine. A fourth example of the method optionally includes any one or more or each of the first through third examples, and further includes wherein the differential pressure sensor is coupled to a gasoline particulate filter. A fifth example of the method optionally includes any one or more or each of the first through fourth examples, and further includes wherein the first baseline air flow is obtained with the wastegate commanded to a fully closed configuration; and wherein the second baseline air flow is obtained with the wastegate commanded to a fully open configuration. A sixth example of the method optionally includes any one or more or each of the first through fifth examples, and further includes wherein the test air flow is obtained via commanding the wastegate to the fully open configuration under conditions where an indication of engine degradation prior to the degradation test includes an indication that the wastegate is stuck closed; and wherein the test air flow is obtained via commanding the wastegate to the fully closed configuration under conditions where the indication of engine degradation includes an indication that the wastegate is stuck open. A seventh example of the method optionally includes any one or more or each of the first through sixth examples, and further includes wherein diagnosing whether the wastegate is functioning as desired includes indicating the wastegate is stuck closed responsive to the test air flow under conditions where the wastegate is commanded to the fully open configuration being within a threshold of the first baseline air flow; and indicating the wastegate is stuck open responsive to the test air flow under conditions where the wastegate is commanded to the fully closed configuration being within a threshold of the second baseline air flow. An eighth example of the method optionally includes any one or more or each of the first through seventh examples, and further includes wherein activating the electric air compressor to obtain the first baseline air flow, the second baseline air flow and/or the test flow further comprises a state of charge of an onboard energy storage device being above a threshold state of charge. A ninth example of the method optionally includes any one or more or each of the first through eighth examples, and further includes wherein the engine is included in a vehicle capable of being plugged in to an electric grid; and wherein activating the air compressor to obtain the first baseline air flow, the second baseline air flow and/or the test flow further comprises an indication that the vehicle is plugged in to the electric grid.

Another example of a method comprises in response to an indication that a vehicle equipped to charge an onboard energy storage device via an electrical connection to an electrical grid is experiencing degradation of an engine in an engine system of the vehicle, the degradation potentially related to an issue with a wastegate coupled to an exhaust system of the engine, and further responsive to an indication that the vehicle is plugged in to the electrical grid: obtaining a test measurement of air flow through the engine system via activating an electric compressor positioned in an intake of the engine to direct air flow through the engine system, where the test measurement of air flow is monitored via a differential pressure sensor positioned downstream of a turbine in the exhaust system, the turbine coupled to a mechanical compressor upstream of the electric compressor; and indicating whether the wastegate is functioning as desired by comparing the test measurement of air flow to one or more baseline air flow measurements obtained under similar circumstances as the test measurement at an earlier time. In a first example of the method, the method further includes wherein the differential pressure sensor is coupled to a gasoline particulate filter. A second example of the method optionally includes the first example, and further includes wherein the one or more baseline air flow measurements include a first baseline air flow measurement and a second baseline air flow measurement, where the first baseline air flow measurement is obtained under conditions where the wastegate is commanded fully closed, and where the second baseline air flow measurement is obtained under conditions where the wastegate is commanded fully open; wherein the first baseline air flow measurement includes a difference between air flow through the engine and through the turbine as compared to air flow around the engine and through the turbine; and wherein the second baseline air flow measurement includes a difference between air flow through the engine and around the turbine as compared to air flow around the engine and around the turbine. A third example of the method optionally includes any one or more or each of the first and second examples, and further includes wherein the test measurement of air flow includes either a first test measurement or a second test measurement, the first test measurement including the wastegate commanded to the fully open position and the second test measurement including the wastegate commanded to the fully closed position; and wherein both the first test measurement and the second test measurement involve determining a difference between at least air flow through the engine as compared to air flow around the engine. A fourth example of the method optionally includes any one or more or each of the first through third examples, and further includes wherein the first test measurement is obtained under conditions where degradation of the engine includes indications of one or more of inaccurate boost, a turbo overspeed condition, and/or engine overheating; and wherein the second test measurement is obtained under conditions where degradation of the engine includes indication of one or more of low boost, degraded fuel economy, and or indications of black smoke being emitted from the exhaust system. A fifth example of the method optionally includes any one or more or each of the first through fourth examples, and further includes wherein air flow through the engine includes an exhaust gas recirculation valve positioned in an exhaust gas recirculation passage being commanded to a fully closed position; and wherein air flow around the engine includes the exhaust gas recirculation valve commanded to a fully open position. A sixth example of the method optionally includes any one or more or each of the first through fifth examples, and further includes wherein activating the electric compressor includes activating the electric compressor to a predetermined speed or predetermined power level.

A system for a hybrid electric vehicle comprises an engine positioned in an engine system, the engine system including an intake and an exhaust system; an exhaust gas recirculation passage including an exhaust gas recirculation valve; a turbine positioned in the exhaust system, the turbine mechanically coupled to a compressor in the intake; a wastegate valve positioned in a wastegate passage, the wastegate passage in parallel with the turbine; an electric compressor positioned in the intake; a differential pressure sensor positioned in the exhaust system downstream of the turbine; and a controller storing instructions in non-transitory memory that, when executed cause the controller to: obtain a first baseline air flow through the engine system via activating the electric compressor with the wastegate valve commanded closed and indicating a difference between a first air flow and a second air flow as monitored via the differential pressure sensor, the first air flow obtained with the exhaust gas recirculation valve closed and the second air flow obtained with the exhaust gas recirculation valve open; obtain a second baseline air flow through the engine system via activating the electric compressor with the wastegate valve commanded open and indicating a difference between a third air flow and a fourth air flow as monitored via the differential pressure sensor, the third air flow obtained with the exhaust gas recirculation valve closed and the second air flow obtained with the exhaust gas recirculation valve open; and in response to an indication that the wastegate is potentially stuck closed, commanding open the wastegate valve and obtaining a first test measurement air flow via activating the electric compressor to determine a difference between a fifth air flow obtained with the exhaust gas recirculation valve closed and a sixth air flow obtained with the exhaust gas recirculation valve open, or in response to an indication that the wastegate is potentially stuck open, commanding the wastegate valve closed and obtaining a second test measurement air flow via activating the electric compressor to determine a difference between a seventh air flow obtained with the exhaust gas recirculation valve closed and an eighth air flow obtained with the exhaust gas recirculation valve open. In a first example of the system, the system further includes wherein the controller stores further instructions to indicate that the wastegate valve is stuck closed in response to the first test measurement air flow being within a first threshold of the first baseline air flow; indicate that the wastegate valve is stuck open in response to the second test measurement being within a second threshold of the second baseline air flow; and indicate that the wastegate valve is degraded in response to the first test measurement air flow not within the first threshold of the first baseline air flow or the second threshold of the second baseline air flow, or in response to the second test measurement air flow not within the first threshold of the first baseline air flow or the second threshold of the second baseline air flow. A second example of the system optionally includes the first example, and further comprises a motor configured to rotate the engine, and wherein obtaining the first baseline air flow, the second baseline air flow, the first test measurement air flow and the second test measurement air flow further includes positioning the engine at a predetermined position prior to activating the electric compressor, the predetermined position including a predetermined piston of a predetermined cylinder of the engine within a threshold number of degrees from a top dead center position.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
activating an electric air compressor in an intake of an engine to obtain a first and a second baseline air flow in an exhaust system of the engine; and
during a degradation test, diagnosing whether a wastegate in the exhaust system is functioning as desired by activating the electric air compressor and comparing a test air flow in the exhaust system to the first and/or the second baseline air flow.

2. The method of claim 1, further comprising:
just prior to activating the electric air compressor to obtain the first baseline air flow, the second baseline air flow, and just prior to diagnosing whether the wastegate is functioning as desired, controlling the engine via a motor to a predetermined position, where the predetermined position includes a predetermined piston coupled to a predetermined cylinder of the engine within a threshold number of degrees from top dead center.

3. The method of claim 1, wherein obtaining the first and the second baseline air flow, and diagnosing whether the wastegate is functioning as desired includes monitoring air flow in the exhaust system of the engine with an exhaust gas recirculation valve positioned in an exhaust gas recirculation passage which is coupled to the exhaust system for a predetermined duration with the exhaust gas recirculation valve closed, then monitoring air flow in the exhaust system of the engine with the exhaust gas recirculation valve open; and obtaining a difference between air flow with the exhaust gas recirculation valve open compared to air flow with the exhaust gas recirculation valve closed to provide the first baseline flow, the second baseline air flow, or the test air flow.

4. The method of claim 1, wherein the first baseline air flow, the second baseline air flow, and the test air flow is monitored via a differential pressure sensor positioned in the exhaust system downstream of a turbine.

5. The method of claim 4, wherein the differential pressure sensor is coupled to a gasoline particulate filter.

6. The method of claim 1, wherein the first baseline air flow is obtained with the wastegate commanded to a fully closed configuration; and wherein the second baseline air flow is obtained with the wastegate commanded to a fully open configuration.

7. The method of claim 6, wherein the test air flow is obtained via commanding the wastegate to the fully open configuration under conditions where an indication of engine degradation prior to the degradation test includes an indication that the wastegate is stuck closed; and wherein the test air flow is obtained via commanding the wastegate to the fully closed configuration under conditions where the indication of engine degradation includes the indication that the wastegate is stuck open.

8. The method of claim 7, wherein diagnosing whether the wastegate is functioning as desired includes indicating the wastegate is stuck closed responsive to the test air flow under conditions where the wastegate is commanded to the fully open configuration being within a threshold of the first baseline air flow; and indicating the wastegate is stuck open responsive to the test air flow under conditions where the wastegate is commanded to the fully closed configuration being within a threshold of the second baseline air flow.

9. The method of claim 1, wherein activating the electric air compressor to obtain the first baseline air flow, the second baseline air flow, and/or the test air flow further comprises a state of charge of an onboard energy storage device being above a threshold state of charge.

10. The method of claim 1, wherein the engine is included in a vehicle capable of being plugged in to an electric grid; and wherein activating the air compressor to obtain the first baseline air flow, the second baseline air flow, and/or the test flow further comprises an indication that the vehicle is plugged in to the electric grid.

11. A system for a hybrid electric vehicle, comprising:
an engine positioned in an engine system, the engine system including an intake and an exhaust system;
an exhaust gas recirculation passage including an exhaust gas recirculation valve;
a turbine positioned in the exhaust system, the turbine mechanically coupled to a compressor in the intake;
a wastegate valve positioned in a wastegate passage, the wastegate passage in parallel with the turbine;
an electric compressor positioned in the intake;
a differential pressure sensor positioned in the exhaust system downstream of the turbine; and
a controller storing instructions in non-transitory memory that, when executed cause the controller to:
obtain a first baseline air flow through the engine system via activating the electric compressor with the wastegate valve commanded closed and indicating a difference between a first air flow and a second air flow as monitored via the differential pressure sensor, the first air flow obtained with the exhaust gas recirculation valve closed and the second air flow obtained with the exhaust gas recirculation valve open;
obtain a second baseline air flow through the engine system via activating the electric compressor with the wastegate valve commanded open and indicating a difference between a third air flow and a fourth air flow as monitored via the differential pressure sensor, the third air flow obtained with the exhaust gas recirculation valve closed and the second air flow obtained with the exhaust gas recirculation valve open; and
in response to an indication that the wastegate valve is potentially stuck closed, commanding open the wastegate valve and obtaining a first test measurement air flow via activating the electric compressor to determine a difference between a fifth air flow obtained with the exhaust gas recirculation valve closed and a sixth air flow obtained with the exhaust gas recirculation valve open, or in response to an indication that the wastegate valve is potentially stuck open, commanding the wastegate valve closed and obtaining a second test measurement air flow via activating the electric compressor to determine a difference between a seventh air flow obtained with the exhaust gas recirculation valve closed and an eighth air flow obtained with the exhaust gas recirculation valve open.

12. The system of claim 11, wherein the controller stores further instructions to indicate that the wastegate valve is stuck closed in response to the first test measurement air flow being within a first threshold of the first baseline air flow;

indicate that the wastegate valve is stuck open in response to the second test measurement being within a second threshold of the second baseline air flow; and indicate that the wastegate valve is degraded in response to the first test measurement air flow not within the first threshold of the first baseline air flow or the second threshold of the second baseline air flow, or in response to the second test measurement air flow not within the first threshold of the first baseline air flow or the second threshold of the second baseline air flow.

13. The system of claim 11, further comprising a motor configured to rotate the engine, and wherein obtaining the first baseline air flow, the second baseline air flow, the first test measurement air flow, and the second test measurement air flow further includes positioning the engine at a predetermined position prior to activating the electric compressor, the predetermined position including a predetermined piston of a predetermined cylinder of the engine within a threshold number of degrees from a top dead center position.

* * * * *